US012766681B2

(12) United States Patent
Mase et al.

(10) Patent No.: US 12,766,681 B2
(45) Date of Patent: Oct. 20, 2026

(54) ELECTRIC TOOL, AND ELECTRIC TOOL SYSTEM

(71) Applicant: NEXERA Field Works Co., Ltd., Osaka (JP)

(72) Inventors: Keisuke Mase, Mie (JP); Naoki Tsuruta, Mie (JP)

(73) Assignee: NEXRA FIELD WORKS CO., LTD., Osaka (JP)

(*) Notice: Subject to any disclaimer, the term of this patent is extended or adjusted under 35 U.S.C. 154(b) by 267 days.

(21) Appl. No.: 18/326,679

(22) Filed: May 31, 2023

(65) Prior Publication Data

US 2023/0398667 A1 Dec. 14, 2023

(30) Foreign Application Priority Data

Jun. 10, 2022 (JP) ................................ 2022-094715

(51) Int. Cl.
*B25B 23/14* (2006.01)
*B25B 23/147* (2006.01)
*B25F 5/00* (2006.01)

(52) U.S. Cl.
CPC .............. *B25B 23/147* (2013.01); *B25F 5/00* (2013.01)

(58) Field of Classification Search
CPC ................................ B25F 5/00; B25B 23/147
USPC ........................................................ 81/467
See application file for complete search history.

(56) References Cited

U.S. PATENT DOCUMENTS 9,256,220 B1 * 2/2016 Coffland ................ B25B 23/14
2019/0294138 A1 9/2019 Dobashi et al.

FOREIGN PATENT DOCUMENTS

JP 2000-334670 A 12/2000
JP 2018-108633 A 7/2018
JP 2020-44641 A 3/2020
KR 101690536 B1 * 12/2016 ................ B25F 5/00

OTHER PUBLICATIONS

Extended European Search Report issued in corresponding European Application No. 23178024.8, dated Nov. 17, 2023.
Notice of Reasons for Refusal received in he corresponding Japanese patent application No. 2022-094715, dated Sep. 30, 2025.

* cited by examiner

*Primary Examiner* — Katina N. Henson
(74) *Attorney, Agent, or Firm* — Rimon P.C.

(57) ABSTRACT

An electric tool includes a tightening unit, a sensor unit that measures at least a tightening torque provided by the tightening unit to obtain working data relating to a result of measurement, a communications unit that transmits the working data, and a storage unit that stores the working data. The electric tool has, as a communications mode for transmitting the working data stored in the storage unit from the communications unit, a first communications mode and a second communications mode. The communications unit is configured to, in the first communications mode, transmit, during an interval between the tightening tasks, first working data which is part of the working data stored in the storage unit, and in the second communications mode, after completion of all of the tightening tasks, transmit at least second working data which is the working data stored in the storage unit except the first working data.

20 Claims, 9 Drawing Sheets

ELECTRIC TOOL, AND ELECTRIC TOOL SYSTEM

CROSS-REFERENCE TO RELATED APPLICATIONS

The present application is based upon and claims the benefit of priority of to Japanese Patent Application No. 2022-094715, filed on Jun. 10, 2022, the entire contents of which are incorporated herein by reference.

TECHNICAL FIELD

The present disclosure relates generally to electric tools and electric tool systems. The present disclosure relates more specifically to an electric tool to be used by a worker for a tightening task, and an electric tool system including the electric tool.

BACKGROUND ART

JP2000-334670A (hereinafter referred to as "Document 1") discloses an electric tool control system (electric tool system) including an electric tool and a center device. The center device transmits preset screw tightening information to the electric tool through a network. The electric tool controls the rotation of the motor based on the received screw tightening information. Furthermore, the center device receives, from the electric tool through the network, a history about the screw tightening work that has been performed by the electric tool, and based on the history, controls a line speed at which a screw tightening target moves in a screw tightening line.

According to the electric tool control system described in the Document 1, the history about the screw tightening work is wirelessly transmitted from the electric tool to the center device during an interval between tasks performed with the electric tool. Therefore, when the amount of information on the history to be transmitted is large, it takes a long time to perform the communication (transmission). When it takes a long time for the electric tool to transmit the information on the history, a length of time during which the screw tightening work cannot be performed becomes long, because the screw tightening work cannot be performed during the transmission. This causes a problem that the user-friendliness of the electric tool decreases.

SUMMARY

It is an object of the present disclosure to provide an electric tool and an electric tool system having an improved user-friendliness.

An electric tool according to one aspect of the present disclosure includes a tightening unit, a sensor unit, a communications unit, a storage unit, and a portable-type tool body. The tightening unit is configured to perform a tightening task of tightening a component by a drive force of a drive source. The sensor unit is configured to perform a measurement processing. The measurement processing includes measuring at least a tightening torque provided by the tightening unit and obtaining working data relating to a result of measurement. The communications unit is configured to transmit the working data. The storage unit is configured to store the working data. The tool body houses therein or holds the tightening unit, the sensor unit, the communications unit, and the storage unit. The electric tool having, as a communications mode for transmitting the working data stored in the storage unit from the communications unit, a first communications mode and a second communications mode. The communications unit is configured to, in the first communications mode, transmit, during an interval between the tightening tasks, first working data, and in the second communications mode, transmit at least second working data after completion of all of the tightening tasks. The first working data is part of the working data stored in the storage unit. The second working data is the working data stored in the storage unit except the first working data.

An electric tool system according to one aspect of the present disclosure includes the electric tool and a receiver. The receiver is configured to receive the working data transmitted from the communications unit.

BRIEF DESCRIPTION OF THE DRAWINGS

The figures depict one or more implementation in accordance with the present teaching, by way of example only, not by way of limitations. In the figures, like reference numerals refer to the same or similar elements where.

DETAILED DESCRIPTION

Embodiment

Figure 1:
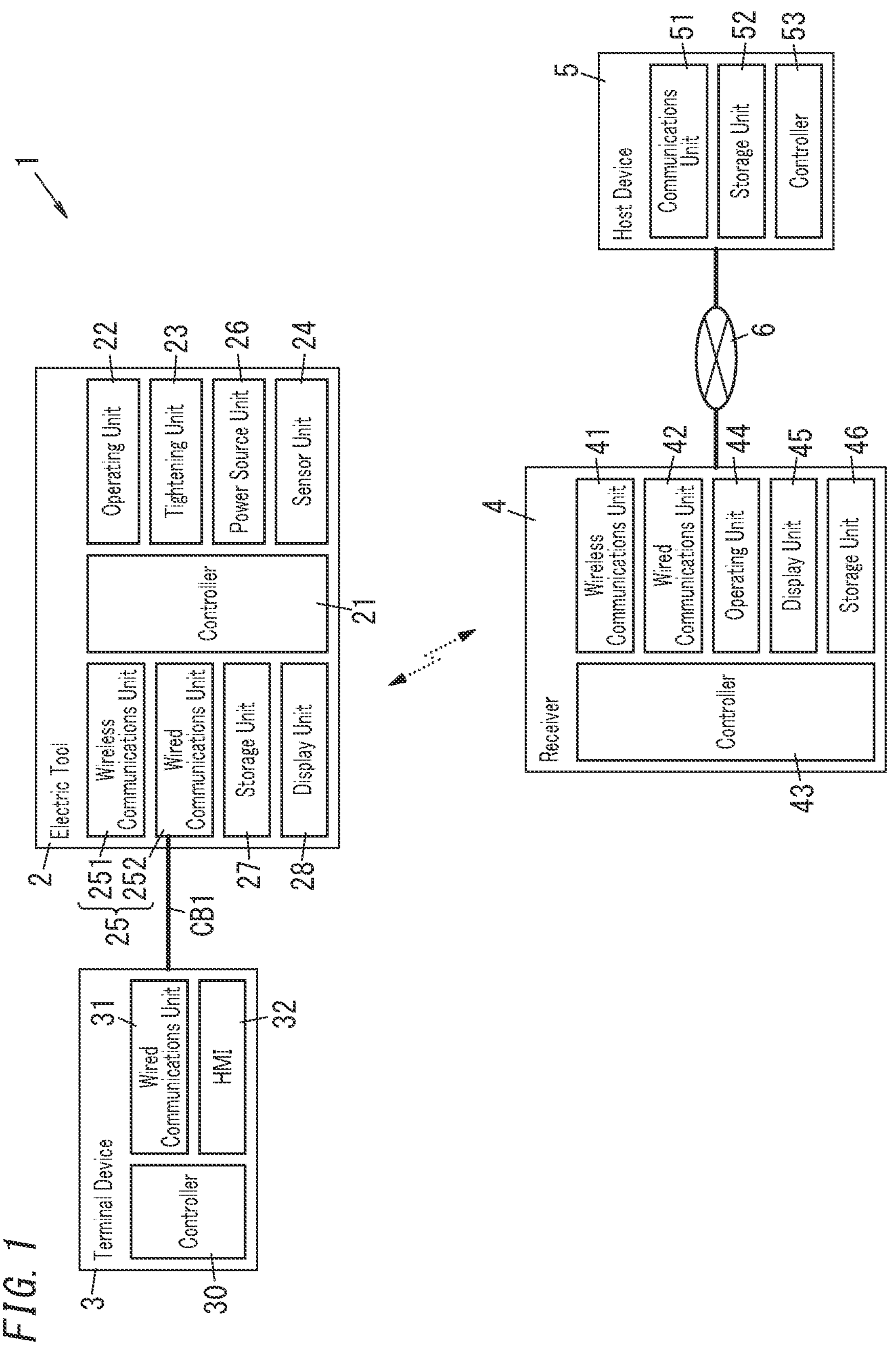
FIG. 1 is a block diagram schematically illustrating an electric tool system including an electric tool according to an embodiment.

The drawings to be referred to in the following description of embodiments are all schematic representations. Thus, the ratio of the dimensions (including thicknesses) of respective constituent elements illustrated on the drawings does not always reflect their actual dimensional ratio.

An electric tool and an electric tool system according to the embodiment of the present disclosure will be described in detail with reference to the attached drawings. However, the embodiment and variations described hereinafter are mere examples of the present disclosure, i.e., the present disclosure is not limited to the embodiment and variations described herein. The embodiment and the variations may be readily modified, changed, replaced, or combined with each other and/or with any other embodiments, depending on a design choice or any other factor, without departing from a true spirit and scope of the present disclosure.

(1) Overview

At first, a main part of an electric tool 2 according to the embodiment is described with reference to FIGS. 1 to 3.

The electric tool 2 includes a tightening unit 23, a controller 21, a sensor unit 24, a communications unit 25, a storage unit 27, and a tool body 200 of a portable-type. The tool body 200 houses therein or holds the tightening unit 23, the controller 21, the sensor unit 24, the communications unit 25, and the storage unit 27.

(1.1) Tightening Task

The tightening unit 23 is configured to perform a tightening task of tightening a component by a drive force of a drive source.

The "tightening task" used herein may be, for example, a task of tightening a first component (such as a nut) with respect to a second component (such as a bolt) performed in an assembly line for performing assembling work on products at a factory, which will be described in detail later. In the assembly line, such kinds of the tightening task may be repeatedly performed at predetermined time intervals over a predetermined period (e.g., in two hours from a.m. 8:00 to a.m. 10:00).

(1.1.1) Sequence of Tightening Tasks

According to the embodiment, the tightening task is performed N times (N is an integer equal to or greater than 2 and may be 100 for example) in the predetermined period. Hereinafter, the entirety of the tightening task performed multiple times (N times) in the predetermined period is referred to as a "sequence of (N times of) tightening task(s)."

(1.1.2) Control of Tightening Task

The controller 21 is configured to control the operations of the tightening unit 23.

The sensor unit 24 is configured to perform a measurement processing.

(1.2) Measurement Processing and Working Data

The measurement processing is a processing including measuring at least a tightening torque provided by the tightening unit 23 and obtaining working data relating to a result of measurement.

The working data is data relating to the tightening task performed by the tightening unit 23. The working data contains information relating to a measurement result of the measurement processing.

The measurement processing may include torque measurement processing, determination processing, and related measurement processing, for example, which will be described in detail later. The working data may be a tightening torque value, determination result data, a related value and the like, for example.

The measurement processing may be performed regularly (periodically) but is not limited thereto. Alternatively, the measurement processing may be performed at odd intervals. According to the embodiment, the sensor unit 24 performs the measurement processing including the above described three kinds of processing with 0.01-second cycle.

Accordingly, 100 pieces of the working data containing the above described three kinds of information are obtained per one second. If it takes 5 seconds for performing the tightening task one time, then the measurement processing is performed 500 times and total 500 pieces of the working data are obtained with respect to the one time tightening task.

It should be noted that the cycle to perform the measurement processing is not limited to 0.01 seconds, but may be appropriately changed to, for example, 0.05 seconds, 0.1 seconds or the like.

(1.3) Transmission of Working Data

The communications unit 25 is configured to transmit the working data obtained by the sensor unit 24.

(1.3.1) Destination

The destination to transmit the working data may include a receiver 4, a terminal device 3, or a host device 5, for example, but is not limited thereto.

(1.3.2) Communications Scheme: Transmission Under Wireless Communications Scheme and Wired Communications Scheme According to the embodiment, one scheme is appropriately selected from a group consisting of a wireless communications scheme and a wired communications scheme and the selected one scheme is used for the transmission of the working data. The wireless communications scheme may be a communications scheme complied with the ZigBee (trademark) standard for example, but is not limited thereto. The wired communications scheme may be a communications scheme complied with the Universal Serial Bus (USB) standard, but is not limited thereto.

Alternatively, only the wireless communications scheme or only the wired communications scheme may be used for the transmission.

(1.3.3) First Alternative for Communications Scheme: Two Kinds of Wireless Communications Scheme In a case where only the wireless communications scheme is used, one of two kinds of wireless communications scheme having different communications rates may be appropriately selected and used. The "two kinds of wireless communications scheme having different communications rates" may be two selected from a group consisting of communication schemes complied with: the Zigbee standard; the Bluetooth (trademark) standard; and the Wi-Fi (trademark) standard and may be, for example: a communications scheme complied with the Zigbee standard; and a communications scheme complied with the Wi-Fi standard.

Alternatively, the "two kinds of wireless communications scheme having different communications rates" may be two communications schemes complied with the same scheme but having different communications rates. An example of such two kinds of wireless communication scheme may be: a communications scheme complied with the Bluetooth Low Energy (BLE) standard; and a communications scheme complied with the (general) Bluetooth standard.

(1.3.4) Second Alternative for Communications Scheme: Two Kinds of Wired Communications Scheme In a case where only the wired communications scheme is used, one of two kinds of wired communications scheme having different communications rates may be appropriately selected and used. The "two kinds of wired communications scheme having different communications rates" may be a communications scheme complied with the USB standard and a communications scheme complied with the Ethernet (trademark) standard.

(1.4) Storing Working Data

The storage unit 27 is configured to store the working data obtained by the sensor unit 24.

The storage unit 27 generally stores the entire of the working data that has been obtained. Alternatively, the storage unit 27 may store part of the obtained working data.

(1.5) Transmission of Stored Working Data

According to the embodiment, the working data obtained by the sensor unit 24 is stored in the storage unit 27, and the communications unit 25 is configured to transmit the working data stored in the storage unit 27.

According to the embodiment, as the progress of the sequence of tightening tasks, a piece of the working data relating to the tightening task currently performed is obtained by the sensor unit 24 and is stored in the storage unit 27 (e.g., recorded on a memory of the storage unit 27).

The communications unit 25 is configured to, during an interval between the tightening tasks (e.g., every time the tightening task finishes one or more times), transmit such data (referred to as "first working data," to be described in detail later) that is part of the working data currently stored in the storage unit 27. Furthermore, the communications unit 25 is configured to, after completion of all of the tightening tasks, transmit at least such data (referred to as "second working data," to be described in detail later) that is the working data stored in the storage unit 27 except the part that has been transmitted (i.e., the first working data).

(1.6) Communications Mode

The "communications mode" referred in the embodiment indicates a mode of the electric tool 2 for transmitting the working data stored in the storage unit 27 from the communications unit 25. The communications mode includes a first communications mode and a second communications mode.

(1.6.1) First Communications Mode and Second Communications Mode

The first communications mode is a mode for transmitting the first working data during an interval between tightening tasks. The second communications mode is a mode for transmitting at least the second working data after completion of all of the tightening tasks.

(1.6.2) First Working Data and Second Working Data

The first working data is part of the working data stored in the storage unit 27. The second working data is the working data stored in the storage unit 27 except the first working data.

The first working data contains the determination result data, and the second working data contains the tightening torque value and the related value, which will be described in detail later. Alternatively, the first working data contains the tightening torque value and the determination result data, and the second working data contains the related value. Further alternatively, the first working data contains the tightening torque value and the second working data contains the related value, whereas the determination result data is not contained either the first working data or the second working data.

(1.6.3) Setting of Communications Mode

According to the embodiment, the communications mode of the electric tool 2 is set using the terminal device 3. Alternatively, the communications mode may be preset to the first communications mode at the initial state before the start of the sequence of tightening tasks, and be automatically changed from the first communications mode to the second communications mode in response to a predetermined trigger, for example.

Figure 9:
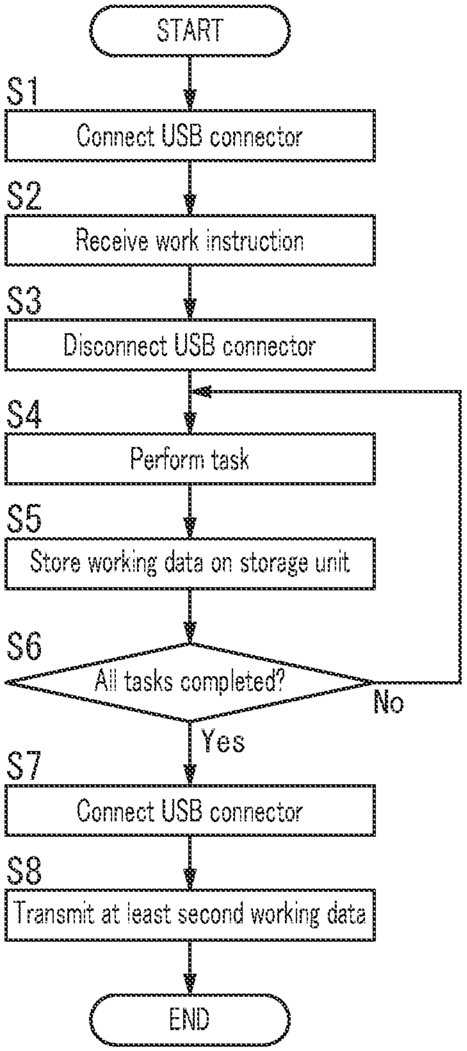
FIG. 9 is a flowchart showing operations of the electric tool in a second communications mode (wired communications mode) according to the embodiment.

Foe example, in a case where the first communications mode is a wireless communications mode and the second communications mode is a wired communications mode (see the section "(3) Specific Example"), the predetermined trigger may be a condition that a USB connector is connected to the electric tool 2 (see the step S7 in FIG. 9). Additionally or alternatively, the predetermined trigger may be the completion of all the tightening tasks. The completion of all of the tightening tasks may be a condition that the electric tool 2 is connected to the terminal device 3 via the communications cable CB1, a condition that a predetermined operation is performed on the electric tool 2 by the worker, or the like, for example.

(1.6.4) Communications Operations in First Communications Mode

In the first communications mode, the communications unit 25 transmits the first working data during an interval between tightening tasks.

(1.6.4a) Interval Between Tightening Tasks

The "interval between tightening tasks" is a period from a time when one tightening task finishes to a time when a next tightening task starts, i.e., an interval between one tightening task and next (following) one tightening task. In the following description, a period from a time when one tightening task starts to a time when this one tightening task finishes may be referred to as a "task period." Also, a period from a time when one tightening task finishes to a time when a next tightening task starts may be referred to as a "waiting period."

Furthermore, N times of task periods, which correspond to the N times of (i.e., the sequence of) tightening task, are referred to as a "first task period," a "second task period," . . . , and a "N-th task period," respectively. Moreover, N times of waiting periods, which correspond to the respective intervals between the N times of (i.e., the sequence of) tightening task, are referred to as a "first waiting period," a "second waiting period," . . . , and a "N-th waiting period," respectively.

Figure 3:
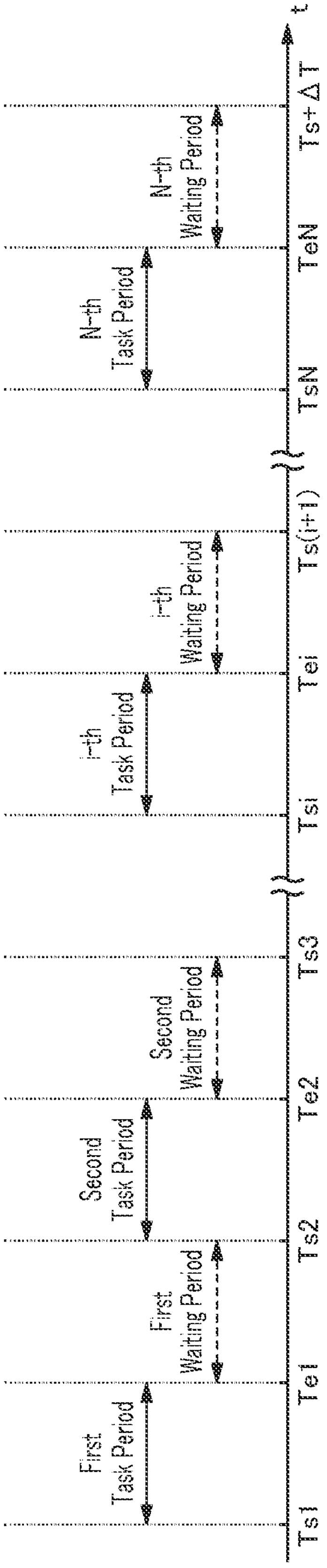
FIG. 3 is a timing-chart illustrating relation between a sequence of tightening tasks performed by the electric tool and transmission timings when first working data is transmitted in a first communications mode according to the embodiment.

Specifically, in the above-described "predetermined period" i.e., a period that contains the first to N-th task periods respectively corresponding to the N times of (i.e., the sequence of) tightening task shown in FIG. 3, a period from an end time (i.e., a time point Te1) of the first task period corresponding to the first tightening task to a start time (i.e., a time point Ts2) of the second task period corresponding to the second tightening task is the "first waiting period." Moreover, a period from an end time (i.e., a time point Te2) of the second task period corresponding to the second tightening task to a start time (i.e., a time point Ts3) of the third task period corresponding to the third tightening task is the "second waiting period."

Similarly, a period from an end time (i.e., a time point Te1) of the i-th task period corresponding to the i-th tightening task (where "i" is a natural number equal to or less than "N") to a start time (i.e., a time point Ts(i+1)) of the (i+1)-th task period corresponding to the (i+1)-th tightening task is the "i-th waiting period." It should be noted that a period from an end time (i.e., a time point TeN) of the N-th task period corresponding to the N-th tightening task to a time (i.e., a time point TsN+ΔT) when a predetermined time ΔT has elapsed is the "N-th waiting period." The predetermined time ΔT may be instructed by work instruction information created by the receiver 4 or the host device 5 etc. and supplied from the receiver 4 or the terminal device 3, for example.

According to the embodiment, each of the first to N-th waiting periods (of N times) is the "interval between tightening tasks." However, the N-th waiting period, out of the N times of the waiting period, may be excluded from the "interval between tightening tasks."

Note that each of the N times of the waiting period (i.e., every waiting period) does not have to be the "interval between tightening tasks." Alternatively, every two waiting periods, every three waiting periods, or the like may be the "interval between tightening tasks," for example. The "every two waiting periods" may be the second waiting period, the fourth waiting period, the sixth waiting period, . . . , for example. The "every three waiting periods" may be the third waiting period, the sixth waiting period, the ninth waiting period, . . . , for example.

(1.6.4b) First Working Data Transmitted During Interval Between Tightening Tasks In the first communications mode, the communications unit 25 transmits, during the interval between tightening tasks, one or more pieces of the first working data corresponding to the latest one or more times of the tightening task (the latest one tightening task, in the embodiment) out of the working data stored in the storage unit 27.

Specifically, in the embodiment, when the i-th tightening task has finished (i.e., at the end time Te1 of the i-th task period), "i" pieces of the working data corresponding to the first to i-th tightening tasks are stored in the storage unit 27. The communications unit 25 is configured to, in the first communications mode, transmit, during the i-th waiting period immediately after the i-th task period, a piece of the first working data corresponding to the latest one (i.e., i-th) tightening task (in other words, a piece of the first working data contained in a piece of the working data obtained in the i-th task period), out of the working data corresponding to the "i" times of the tightening tasks and stored in the storage unit 27. Note that, in the alternative case where the "interval between tightening tasks" is "every two waiting periods", the communications unit 25 transmits, during the i-th waiting period (i≥2), two pieces of the first working data corresponding to the latest two (i.e., (i−1)-th and i-th) tightening tasks (in other words, two pieces of the first working data contained in two pieces of the working data obtained in the (i−1)-th task period and the i-th task period).

Note that in a configuration where the communications mode automatically changes from the first communications mode to the second communications mode in response to the completion of all of the N times of the tightening task, a piece of the first working data corresponding to the last (i.e., N-th) tightening task may be transmitted immediately after the transition to the second communications mode together with the second working data.

(1.6.5) Communications Operations in Second Communications Mode

In the second communications mode, the communications unit 25 transmits, after the completion of all of the tightening tasks, (all pieces of) the second working data corresponding to all of the tightening tasks out of the working data stored in the storage unit 27.

(1.6.6) After Completion of all of Tightening Tasks

"After completion of all of the tightening tasks" used herein indicates a time after the last (N-th) task of the N times (i.e., the sequence) of tightening task finishes.

(1.6.7) Transmission of at Least Second Working Data

Examples of "to transmit at least the second working data" may include "to transmit only the second working data and not to transmit the first working data" and "to transmit not only the second working data but also the first working data."

According to the embodiment, the communications unit 25 transmits only the second working data and does not transmit the first working data, in the second communications mode. That is, the first working data that has been transmitted in the first communications mode is not re-transmitted in the second communications mode. According to this, the embodiment can contribute to reducing the data amount of the working data transmitted in the second communications mode (as a result, to reduce the total amount of the working data transmitted in the first communications mode and the second communications mode) compared to a case where the first working data is also transmitted in the second communications mode.

Alternatively, the communications unit 25 may be configured to transmit both the first working data and the second working data in the second communications mode. In other words, the entirety of the working data (i.e., detail working data, which will be described later) containing the first working data that has been transmitted in the first communications mode may be transmitted in the second communications mode.

(1.7) Operations Example

Figure 2:
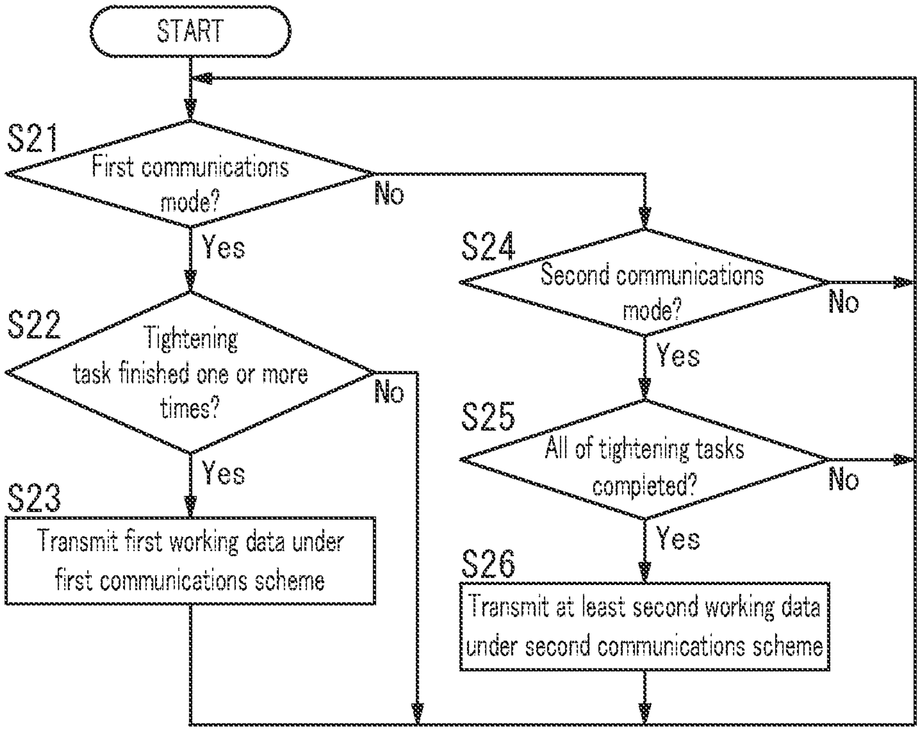
FIG. 2 is a flowchart showing operations of the electric tool according to the embodiment.

The communications unit 25 of the electric tool 2 may operate in accordance with the flowchart shown in FIG. 2, for example. The procedure according to this flowchart may start when the electric tool 2 is powered on, and end when the electric tool 2 is powered off, for example. The procedure according to this flowchart is in a premise that the communications mode is in the first communications mode at the initial state before the start of the sequence of tightening tasks, and changes from the first communications mode to the second communications mode in response to the completion of the sequence of (i.e., N times of) tightening tasks.

The communications unit 25 determines whether the communications mode is in the first communication mode or not (in step S21). If the communications mode is determined not to be in the first communications mode (No in the step S21), the procedure transits to a step S24 (described later).

Determining that the communications mode is in the first communications mode (Yes in the step S21), the communications unit 25 further determines whether the tightening task finishes one or mores times (i.e., a predetermined number of times) (in step S22). Determined that the tightening task has not finished the one or more times yet (No in the step S22), the procedure returns to the step S21.

Determining that the tightening task has finished the one or more times in the step S22 (Yes in the step S22), the communications unit 25 transmits one or more pieces of the first working data corresponding to the one or more times of the tightening task under a first communication scheme (e.g. the wireless communications scheme) (in step S23). Thereafter, the procedure returns to the step S21.

Determining that the communications mode is not in the first communications mode in the step S21 (No in the step S21), the communications unit 25 further determines whether the communications mode is in the second communications mode or not (in step S24). Determined that the communications mode is not in the second communications mode (No in the step S24), the procedure returns to the step S21.

Determining that the communications mode is in the second communications mode in the step S24 (Yes in the step S24), the communications unit 25 further determines whether all of the tightening tasks are completed (in other words, determines whether the N-th tightening task has finished) (in step S25). Determined that all of the tightening tasks have not been completed yet (No in the step S25), the procedure returns to the step S21.

Determining that all of the tightening tasks have been completed in the step S25 (Yes in the step S25), the communications unit 25 transmits at least the second working data corresponding to all of (the N times of) the tightening tasks under a second communications scheme (e.g. the wired communications scheme) (in step S26). Thereafter, the procedure returns to the step S21. For example, the communications unit 25 may determine the completion of all of the tightening tasks when the communications unit 25 is connected to the terminal device via the communications cable CB1.

According to this example, the communications mode is set to the first communications mode at the initial state of the sequence of tightening tasks and thus the determination result in the step S21 is "Yes" while the sequence of tightening tasks is performed. As a result, the procedure runs in a loop of the steps S21 to S23. When the sequence of tightening tasks has completed, the communications mode changes from the first communications mode to the second communications mode, and thus the determination result in the step S21 changes from "Yes" to "No," and the steps S24 to S26 are performed.

(1.8) Advantages

According to the embodiment, as described above, the communications mode for the communications unit 25 includes the first communications mode and the second communications mode; and the communications unit 25 transmits, in the first communications mode, part (i.e., the first working data) of the working data during the interval between tightening tasks and transmits, in the second communications mode, at least remaining part (i.e., the second working data) of the working data after completion of all of the tightening tasks. This configuration can contribute to shortening a period (waiting period) during which the tightening task is not performed. As a result, the tightening task is less likely to be interrupted by the transmission of the working data, and the user-friendliness of the electric tool 2 can be improved.

(2) Details

Next, the electric tool 2 is described in further detail.

(2.1) Measurement Processing

The measurement processing performed by the sensor unit 24 includes, for example, the torque measurement processing, the determination processing, and the related measurement processing.

(2.1.1) Torque Measurement Processing

The torque measurement processing includes performing a torque measurement of measuring the tightening torque to obtain a tightening torque value.

(2.1.2) Tightening Torque Value

The tightening torque value is a result of the torque measurement described above.

(2.1.3) Determination Processing

The determination processing includes performing a determination about a quality of the tightening task (e.g., whether it is good or not) based on the tightening torque value to obtain determination result data.

(2.1.4) Determination Result Data

The determination result data relates to a result of the determination described above. The determination result data may be either of "OK" indicating that the determination result is good and "NG" indicating that the determination result is not good (i.e., bad).

Alternatively, the determination result data may include only "OK" indicating the good result, or only "NG" indicating the bad result. In a case where the determination result data includes only "OK," if a result of the determination about the quality of a tightening task is not good, then no piece of the determination result data is provided (i.e., "blank" determination result data is provided) with respect to this tightening task, for example.

(2.1.5) Related Measurement Processing

The related measurement processing includes performing a related measurement relating to the torque measurement to obtain a related value.

(2.1.6) Related Measurement

The related measurement includes a main related measurement and an auxiliary related measurement.

(2.1.6a) Main Related Measurement

The main related measurement may include: measurement of the number of strokes; measurement of the rotation speed; measurement of the tightening time; measurement of the angle (angle of rotation); and the like, for example.

The number of strokes indicates the number of times that the impact mechanism provides the impact force to an output shaft 231. The rotation speed indicates the rotation speed of the output shaft 231. The tightening time indicates a time required to perform the tightening task one time.

The angle (angle of rotation) indicates the angle that the first component rotates relative to the second component according to the rotation of the output shaft 231. The "angle" may include an angle of rotation before seating (pre-seating rotation angle) and an angle of rotation after seating (post-seating rotation angle). The pre-seating rotation angle indicates an angle of rotation the first component has rotated from the start of the tightening task to the seating. The post-seating angle indicates an angle of rotation the first component has rotated from the seating to the end of the tightening task.

(2.1.6b) Auxiliary Related Measurement

The auxiliary related measurement may include: measurement of the remaining battery level; obtaining date-and-time information (such as a working date and clock time); and the like, for example.

The remaining battery level indicates the remaining quantity of a storage battery provided in a power source unit 26. The sensor unit 24 is configured to measure the remaining battery level via the power source unit 26.

The date-and-time information may include the date at which the sequence of tightening tasks has performed, a start time(s), and an end time(s), and the like. The sensor unit 24 may obtain the date-and-time information from the built-in clock of a processor, the Network Time Protocol (NTP) server, or the like, for example.

(2.1.7) Related Value

The related value is a result of the related measurement. The related value indicates a result(s) of the various related measurement described above, for example.

(2.1.7a) Cycle of Related Measurement

The main related measurement may be performed, for example, with the same cycle as the torque measurement, namely with 0.01-second cycle. Alternatively, the main related measurement may be performed with a cycle different from the cycle of the torque measurement (e.g., a cycle longer than that of the torque measurement).

The auxiliary related measurement may be performed at a start time and an end time of the sequence of tightening tasks. Alternatively, the auxiliary related measurement may be performed at either the start time or the end time of the sequence of tightening tasks only. Optionally, the auxiliary related measurement may be performed with respect to each of the tightening tasks constituting the sequence of tightening tasks (e.g., performed at a start time and/or an end time of each of the tightening tasks).

(2.1.8) Details of First Working Data and Second Working Data (2.1.8a) First Working Data The first working data contains at least one kind of information selected from a group consisting of the tightening torque value and the determination result data. According to the embodiment, the first working data contains the determination result data and does not contain the tightening torque value as described above.

(2.1.8b) Second Working Data

The second working data contains one or more kinds of information selected from a group consisting of the tightening torque value, the determination result data, and the related value except the at least one kind of information contained in the first working data. According to the embodiment, the second working data contains the tightening torque value and the related value and does not contain the determination result data.

(2.1.8c) Advantages

According to the embodiment, the first working data contains the determination result data, and the second working data contains the tightening torque value and the related value, as described above. This can reduce the amount of information of the working data (hereinafter, referred to as "transmission amount") transmitted in the first communications mode, and accordingly can contribute to shortening the waiting period. As a result, the tightening task is further less likely to be interrupted by the transmission of the working data, which can improve the user-friendliness.

Note that, in an alternative case where the first working data contains the tightening torque value and does not contain the determination result data which will be described later in the section "(2.6) First Variation of First Working Data and Second Working Data", the transmission amount in the first communications mode also can be reduced. However, in this case, the quality (good or not) is determined by a receiver 4 (described later) side, which causes an increase in the processing load on the receiver 4 side. Compared to this case, the embodiment can contribute to reducing the processing load on the receiver 4 side. This reduction effect become more prominent as the increase in the number of the electric tools 2 that communicate with the receiver 4.

(2.2) Operations of Communications Unit in First Communications Mode

In the first communications mode, every time the tightening task finishes one or more times (i.e., every time the tightening task finishes the predetermined number of times) (in the embodiment, once), the communications unit 25 transmits one or more pieces of the first working data corresponding to the one or more times of the tightening task out of the working data stored in the storage unit 27.

In other words, in the first communications mode, during the i-th waiting period which starts when the i-th tightening task has just finished, a piece of the first working data corresponding to the i-th tightening task (i.e., a piece of the first working data of the working data obtained in the i-th task period) out of the working data corresponding to the total "i" times of the tightening tasks stored in the storage unit 27, for example.

(2.3) Operations of Communications Unit in Second Communications Mode

In the second communications mode, after completion of all of the tightening tasks, the communications unit 25 transmits at least the second working data corresponding to all of the tightening tasks out of the working data stored in the storage unit 27.

According to the embodiment, only the second working data is transmitted in the second communications mode, as described above. Alternatively, "detail working data" containing both the first working data and the second working data may be transmitted in the second communications mode, as in a case described later in the section "(2.8) Variation of Operations of Communications Unit in Second Communications Mode."

(2.4) Advantages to Transmission by Combination of First Communications Mode and Second Communications Mode According to the embodiment, every time the tightening task finishes one or more times, one or more pieces of the first working data corresponding to the one or more times of the tightening task is transmitted, and also after completion of all of the tightening tasks, the second working data corresponding to all of the tightening tasks is transmitted. This configuration can contribute to equally shortening the waiting periods (e.g. the first waiting period, the second waiting period, . . . , the N-th waiting period, shown in FIG. 3) contained in the sequence of tightening tasks.

Deletion of Transmitted Data.

The storage unit 27 is configured to, from the storage unit 27, delete part of the working data that has been transmitted by the communications unit 25 (hereinafter, referred to as "transmitted data").

According to the embodiment, the transmitted data is automatically deleted, which can contribute to saving the available memory space of the storage unit 27.

(2.6) First Variation of First Working Data and Second Working Data

According to this variation, the first working data contains the tightening torque value, and does not contain the determination result data. Also, the second working data contains the related value. The determination result data is not contained the second working data, either.

According to the variation, on the receiver 4 (described later) side, the quality of the tightening task (whether it is good or not) is determined based on the tightening torque value contained in the received first working data and the determination result data is obtained.

(2.7) Second Variation of First Working Data and Second Working Data

According to this variation, the first working data contains the tightening torque value and the determination result data, and the second working data contains the related value.

(2.8) Variation of Operations of Communications Unit in Second Communications Mode According to this variation, the communications unit 25 transmits, in the second communications mode, the detail working data after the completion of all of the tightening tasks.

(2.8.1) Detail Working Data

The detail working data is data relating the detail of the sequence of tightening tasks. The detail working data contains both the first working data and the second working data. The detail working data contains the determination result data, the tightening torque value, and the related value, with regard to all of (i.e., N times of) the tightening tasks constituting the sequence of tightening tasks. In the variation, therefore, despite the first working data which is part of the detail working data is transmitted in the first communications mode, (entire of) the detail working data containing the first working data is transmitted in the second communications mode.

(2.8.2) Non Deletion of Determination Result Data, and Deletion of Detail Working Data According to the variation, in the first communications mode, the storage unit 27 is configured, even when the communications unit 25 transmits the determination result data, not to delete the determination result data that has been transmitted.

According to the variation, in the second communications mode, the storage unit 27 is configured, when the communications unit 25 transmits the detail working data, to delete the detail working data that has been transmitted.

(2.8.3) Advantages

According to the variation, only the determination result data which is part of the detail working data is transmitted in the first communications mode, and (entire of) the detail working data containing the determination result data is transmitted in the second communications mode. Moreover, the determination result data that has been transmitted is not deleted in the first communications mode, but in the second communications mode (entire of) the detail working data that has been transmitted is deleted. The variation can contribute to saving the available memory space in the storage unit 27 while allowing the transmission of the entirety of the detail working data.

Note that in the variation, the storage unit 27 may be configured, in the second communications mode, not to delete immediately but keep the detail working data that has been transmitted as long as possible. Specifically, the storage unit 27 may be configured, when finding that the available memory space for recording the detail working data is full, to delete, from the memory, a piece(s) of the detail working data from the oldest one and then store a new piece of the detail working data.

Alternatively, the storage unit 27 may be configured, in the second communications mode, not to delete but keep holding the detail working data that has been transmitted. Specifically, the storage unit 27 may be configured, when finding that the available memory space is full, to stop the operation of storing the new piece of the detail working data.

(2.9) Details of Communications Scheme: Wireless Communication and Wired Communication According to the embodiment, the communications unit 25 includes a wireless communications unit 251 configured to transmit the working data under the wireless communications scheme; and a wired communications unit 252 configured to transmit the working data under the wired communications scheme (see FIG. 1).

The first communications mode described above is a wireless communications mode, and the second communications mode described above is a wired communications mode. In the wireless communications mode, when the tightening task finishes one or more times, the wireless communications unit 251 transmits, under the wireless communications scheme, the working data relating to the measurement result output from the sensor unit 24. In the wired communications mode, the wired communications unit 252 transmits, under the wired communications scheme, the working data stored in the storage unit 27.

According to the embodiment, the electric tool 2 is designed to be used for tightening a component. The electric tool 2 is a portable tool carried and used by a user. The "tightening task" performed using the electric tool 2 may be a task of tightening a nut as the first component with respect to a bolt as the second component, for example. However, the first component and second component are not limited to the nut and bolt, but appropriate other components may be used. Moreover, the tightening task may be a task of tightening a plurality of first components with respect to one second component. The plurality of first components may be components of the same kind, or may be multiple kinds of components, whichever is appropriate. The "working data" relating to the measurement result of the sensor unit 24 may contain a measured value (e.g., maximum value, average value, or the like) of the tightening torque measured by the sensor unit 24, time-series data (such as waveform data) indicating the temporal variation of the tightening torque during the tightening task, and the like. Additionally or alternatively, the working data may contain data indicating the determination result of the quality (good or not) of the working details determined based on the measured values of the tightening torque measured by the sensor unit 24 and the like. Moreover, the sensor unit 24 may measure the rotation speed of the motor as the drive source, current value of a current flowing through the motor, and the like, other than the tightening torque. Measurement target of the sensor unit 24 may be appropriately determined and changed.

According to the embodiment, the electric tool 2 has, as the communications mode of the communications unit 25, at least the wireless communications mode and the wired communications mode. In the wired communications mode, the wired communications unit 252 transmits, under the wired communications scheme, the working data stored in the storage unit 27 while operating in the wired communications mode. According to this configuration, the tightening task is less likely to be interrupted by the transmission of the working data compared to a configuration where the working data is transmitted during the interval between tightening tasks under the wireless communications scheme. The user-friendliness can be improved accordingly. Furthermore, in a communications environment where the wireless communication between the electric tool 2 and a communications partner is not good, it is possible to transmit the working data by the wired communications mode by setting the communications mode of the communications unit 25 to the wired communications mode, which can improve the user-friendliness. Moreover, since the wired communications scheme is generally faster in the transmission rate than the wireless communications scheme, the working data stored in the storage unit 27 while operating in the wired communications mode can be transmitted in a short time, which can improve the user-friendliness. In the wireless communications mode, the electric tool 2 operates in response to the reception of the work instruction information relating to the tightening task, while in the wired communications mode, the electric tool 2 operates alone after receiving the work instruction information under the wired communications scheme. Therefore, the wired communications mode may be referred to as a "standalone mode."

When the communications mode is set to both the wireless communications mode and the wired communications mode, the communications unit 25 can perform both of: a wiles communication by the wireless communications unit 251; and a wired communication by the wired communications unit 252. The wireless communication by the wireless communications unit 251 is always possible, whereas the wired communication by the wired communications unit 252 is possible when the wired communications unit 252 is connected to the terminal device 3 via a wire.

Note that, in the description of the embodiment below, the communications mode of the communications unit 25 is set to be either the wireless communications mode or the wired communications mode.

Figure 4:
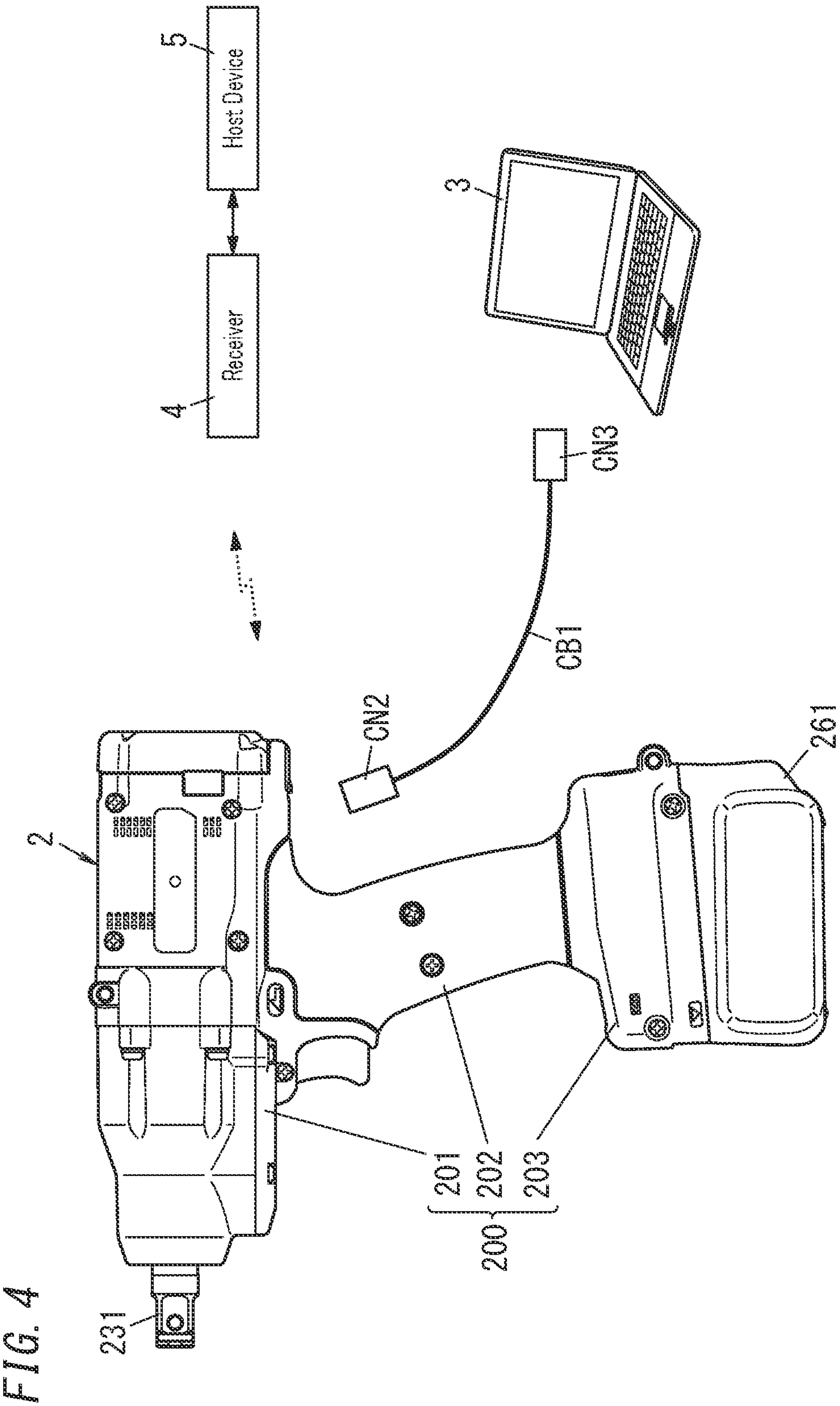
FIG. 4 is a schematic system configuration diagram of the electric tool system according to the embodiment.

As shown in FIGS. 1 and 4, an electric tool system 1 includes the electric tool 2 and the receiver 4. The receiver 4 is configured to receive the working data transmitted from the electric tool 2.

Although FIGS. 1 and 4 illustrate only one electric tool 2, the number of electric tools 2 may be two or more. In other words, the electric tool system 1 may include a plurality of the electric tools 2. The receiver 4 may be configured to communicate with each of the plurality of electric tools 2.

(2.10) Details of First Variation of Communications Scheme: Two Kinds of Wireless Communications Scheme According to this variation, the communications unit 25 includes: a first wireless communications unit configured to transmit the first working data under a first wireless communications scheme; and a second wireless communications unit configured to transmit the second working data under a second wireless communications scheme. The first wireless communications scheme may be the ZigBee scheme and the second wireless communications scheme may be the Wi-Fi scheme, for example.

According to the variation, the first communications mode described above is a first wireless communications mode, and the second communications mode described above is a second wireless communications mode. In the first wireless communications mode, when the tightening task finishes one or more times, the first wireless communications unit transmits one or more pieces of the first working data corresponding to the one or more times of the tightening task under the first wireless communications scheme. In the second wireless communications mode, after completion of all of the tightening tasks, the second wireless communications unit transmits the second working data corresponding to all of the tightening tasks under the second wireless communications scheme. It is therefore possible to wirelessly transmit the first working data and the second working data with the transmission rate appropriate to their individual amount of the information.

(2.11) Details of Second Variation of Communications Scheme: Two Kinds of Wired Communications Scheme According to this variation, the communications unit 25 includes: a first wired communications unit configured to transmit the first working data under a first wired communications scheme; and a second wired communications unit configured to transmit the second working data under a second wired communications scheme. The first wired communications scheme may be the USB scheme and the second wired communications scheme may be the Ethernet scheme, for example.

According to the variation, the first communications mode described above is a first wired communications mode, and the second communications mode described above is a second wired communications mode. In the first wired communications mode, when the tightening task finishes one or more times, the first wired communications unit transmits one or more pieces of the first working data corresponding to the one or more times of the tightening task under the first wired communications scheme. In the second wired communications mode, after completion of all of the tightening tasks, the second wired communications unit transmits the second working data corresponding to all of the tightening tasks under the second wired communications scheme. It is therefore possible to, in the wired transmission, transmit the first working data and the second working data with the transmission rate appropriate to their individual amount of the information.

(3) Specific Example

Hereinafter, a specific example of the electric tool 2 and the electric tool system 1 including the electric tool 2 according to the embodiment is described in further detail with reference to the drawings. The example described below is mere an example of the present disclosure and may be readily modified or changed.

(3.1) Configuration

One configuration of the electric tool system 1 is described with reference to FIGS. 1, 4, and 5.

The electric tool system 1 of the embodiment may be used, for example, in an assembly line to perform assembling work on products at a factory. Note that the electric tool system 1 does not have to be applied to the assembly line in the factory, but may be applied to any other application as well. Alternatively, the electric tool system 1 may be used, for example, for construction work to construct a building in a construction site.

As shown in FIG. 1, the electric tool system 1 includes the electric tool 2 and the receiver 4. The electric tool system 1 may, for example, further include the host device 5 configured to communicate with the receiver 4 through a network 6. Note that the electric tool system 1 does not have to include the host device 5, namely the host device 5 may be omitted as appropriate. To the electric tool 2, the terminal device 3 can be connected which is configured to be connected to the electric tool 2 via a communications cable CB1 and to perform wired communications with the electric tool 2.

Components of the electric tool system 1 will be described with reference to the drawings.

(3.1.1) Electric Tool

As shown in FIG. 1, the electric tool 2 includes the controller 21, an operating unit 22, the tightening unit 23, the sensor unit 24, the communications unit 25, the power source unit 26, the storage unit 27, and a display unit 28.

Figure 5:
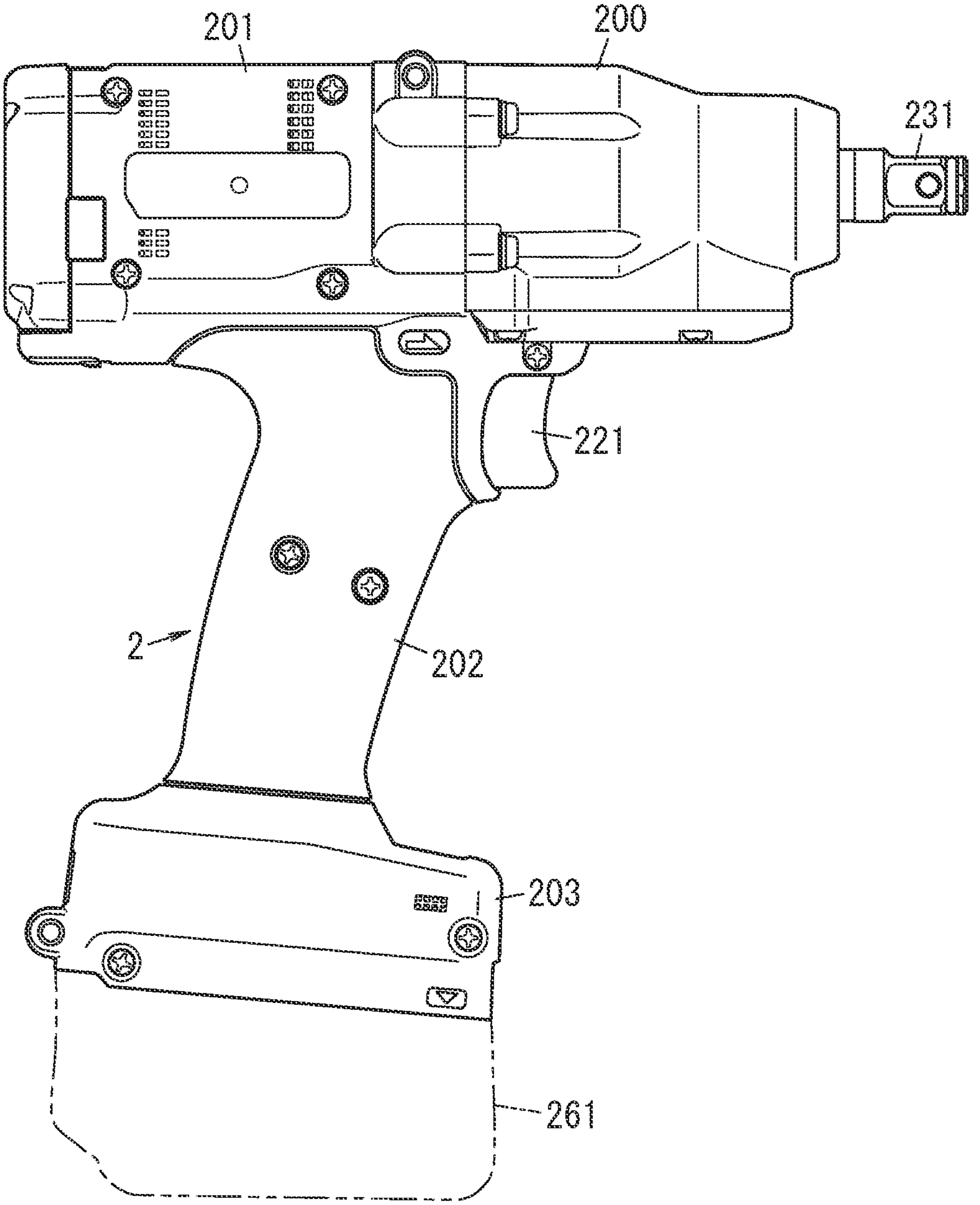
FIG. 5 is a schematic side view of the electric tool according to the embodiment.
Figure 6:
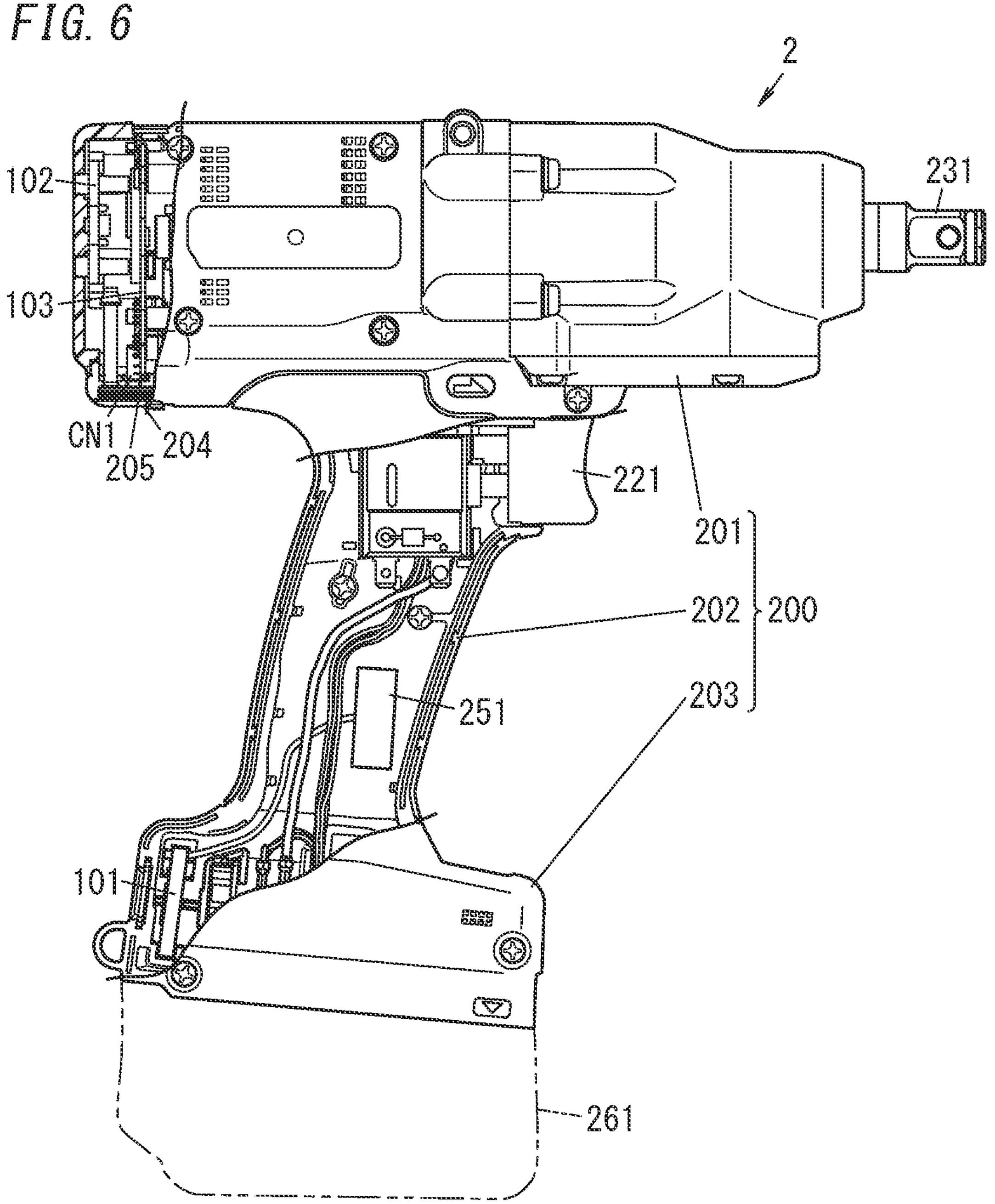
FIG. 6 is a partially cutaway side view of the electric tool according to the embodiment.

As shown in FIGS. 4 to 6, the electric tool 2 further includes the tool body 200 of portable-type that houses therein or holds the components thereof. The tool body 200 includes a barrel 201 formed in a cylindrical shape, and a grip 202 protruding from a part of the circumferential surface of the barrel 201 along a radial direction of the barrel 201. The output shaft 231 protrudes from one axial end of the barrel 201. To the output shaft 231, a socket is attached to which a tip tool (such as a torque wrench bit) is removably attached in accordance with a first component as a work target. Accordingly, a user-desired tip tool can be attached to the output shaft 231 via the socket. A battery attachment base 203 is provided at an end (lower end in FIG. 5) of the grip 202. To the battery attachment base 203, a battery pack 261 is removably attached. The battery pack 261 is composed of the power source unit 26 and a case made of resin that houses therein the power source unit 26.

The tightening unit 23 includes the output shaft 231, the motor configured to rotate the output shaft 231, and a driver circuit configured to drive the motor. According to the embodiment, the electric tool 2 is an impact tool, and thus the tightening unit 23 includes an impact mechanism configured to generate impacting force acting on the output shaft 231. The impact mechanism is configured to, when an output torque is less than or equal to a predetermined level, transmit the output torque of the output shaft of the motor to the output shaft 231 with a reduced speed to thereby rotate the first component. The impact mechanism is configured to, when the output torque exceeds the predetermined level, apply the impacting force to the output shaft 231 to thereby rotate the first component. The motor and the impact mechanism are housed in the barrel 201.

The controller 21 controls operations of the tightening unit 23, the sensor unit 24, the communications unit 25 and the like. The controller 21 may include, as a major constituent element thereof, a computer system including one or more processors and one or more memories, for example. The computer system performs the function of the controller 21 by making the one or more processors execute a program stored in the one or more memories. The program may be stored in advance in the memory of the controller 21. Alternatively, the program may also be distributed after having been stored in a non-transitory storage medium such as a memory card or downloaded via a telecommunications line. The controller 21 may be implemented as a Field-Programmable Gate Array (FPGA), Application Specific Integrated Circuit (ASIC) or the like. A microcontroller (including a circuit board etc.) functioning as the controller 21 may be housed in the grip 202, for example.

The operating unit 22 includes a trigger switch 221 provided to the grip 202. In response to the operation provided by the user on the trigger switch 221, an operation signal having a signal level proportional to a pulled amount (operation amount) of the trigger switch 221 is provided to the controller 21. The controller 21 controls the rotation speed of the motor of the tightening unit 23 such that the output shaft 231 rotates at a speed corresponding to the operation signal provided from the operating unit 22.

The sensor unit 24 is configured to measure the tightening torque provided by the tightening unit 23 to obtain the tightening torque value. The sensor unit 24 includes a magnetostrictive type torque sensor provided to the output shaft 231. The magnetostrictive type torque sensor is configured to detect, using a coil provided to a non-rotating part of the electric tool 2, variations in the magnetic permeability in the output shaft 231 derived from the distortion of the output shaft 231 according to the torque acting thereon, and to output a voltage signal proportional to the distortion. The sensor unit 24 can measure the torque applied to the output shaft 231 in this manner. In other words, the sensor unit 24 is configured to measure the torque (tightening torque) that the electric tool 2 applies to the first component as the work target. The sensor unit 24 outputs the measured value of the torque (the tightening torque value) to the controller 21. Alternatively, the sensor unit 24 may be configured to measure the torque applied to the output shaft of the motor, and to obtain the tightening torque applied to the output shaft 231 based on the torque applied to the output shaft of the motor and a reduction ratio of a speed reducer mechanism. The sensor unit 24 is not limited to the one including the magnetostorictive type torque sensor, but specific configuration of the sensor unit 24 may be appropriately changed. In an alternative example, the sensor unit 24 may be configured to measure the tightening torque for tightening the first component with respect to the second component, by detecting a current flowing through the motor of the tightening unit 23.

The controller 21 is configured to control the tightening unit 23 such that the tightening torque value for the first component agrees to a torque setting value that is set based on the work instruction information supplied from the receiver 4 or the terminal device 3. For example, the controller 21 stops the rotation of the motor of the tightening unit 23 when the tightening torque value measured by the sensor unit 24 reaches the torque setting value. The torque setting value may be changeable and may be changed by the controller 21 based on the work instruction information supplied to the electric tool 2 from the receiver 4 or the terminal device 3. The "work instruction information" used herein may preferably contain information relating to the working details of one or more times of the tightening task to be performed by the electric tool 2. The work instruction information may contain information indicating the working details corresponding to the one or more times of the tightening task, for example. When the task to be performed using the electric tool 2 is the tightening task, the work instruction information may preferably contain information relating to tightening torque. The information relating to tightening torque may be a target value of the tightening torque (i.e., torque setting value), or may be the (target) number of strokes in a case where the electric tool 2 is the impact tool. In a case where the task to be performed using the electric tool 2 is so called a batch work in which a unit task of a predetermined work detail is performed plurality times one after another, the work instruction information may preferably contain batch work information and number information. The batch work information may relate to the predetermined work detail of the unit task, such as the target value of the tightening torque. The number information may relate to the number of times that the unit task is to be performed in turn. The "unit task is to be performed in turn" used herein does not have to be limited to a case where the unit tasks are repeatedly performed without a break, but may be a case where the unit tasks are performed with intervals between unit tasks unless another task is performed in the interval.

The communications unit 25 includes, as described above, the wireless communications unit 251 and the wired communications unit 252.

The wireless communications unit 251 includes a communications module configured to perform a near field wireless communication compliant with the ZigBee standard, for example. The wireless communications unit 251 is configured to perform the wireless communication with the receiver 4 under such kinds of communications scheme. In the wireless communications mode, the wireless communications unit 251 transmits, to the receiver 4 under the wireless communications scheme, the working data that is temporarily stored in a memory of the controller 21 such as a random access memory (RAM). In a configuration where the wireless communications unit 251 reads out the working data stored in the storage unit 27 such as an Electrically Erasable and Programmable Read-Only Memory (EEPROM) and wirelessly transmits the read out data to the receiver 4, it spends some time to access the storage unit 27, which lengthens the time requited to transmit the working data. Since the controller 21 controls the tightening unit 23 so as not to perform the tightening task during a time when the communications unit 25 transmits the working data, taking a long time to transmit the working data will cause a problem of lengthening a waiting time until the start of the next tightening task and therefore lengthening the task cycle when the tightening task is repeatedly performed. Contrary to this, according to the embodiment, the wireless communications unit 251 transmits, to the receiver 4, the working data temporarily stored in the memory such as the RAM under the wireless communications scheme as described above. This configuration can omit the time to access the storage unit 27 such as the EEPROM, and as a result the waiting time until the start of the next tightening task can be shortened, and the task cycle can also be shortened when the tightening task is repeatedly performed.

Note that the wireless communications scheme between the wireless communications unit 251 and the receiver 4 may be another wireless communications scheme that uses a radio wave as a communications medium, such as that complied with, e.g., the standard of the specified low power radio station (radio station without requiring a license) using 920 MHz band, the Wi-Fi standard, the Bluetooth standard, and the like. The wireless communications unit 251 may be housed in the grip 202, and an antenna of the wireless communications unit 251 may be housed in the barrel 201, for example.

Figure 7:
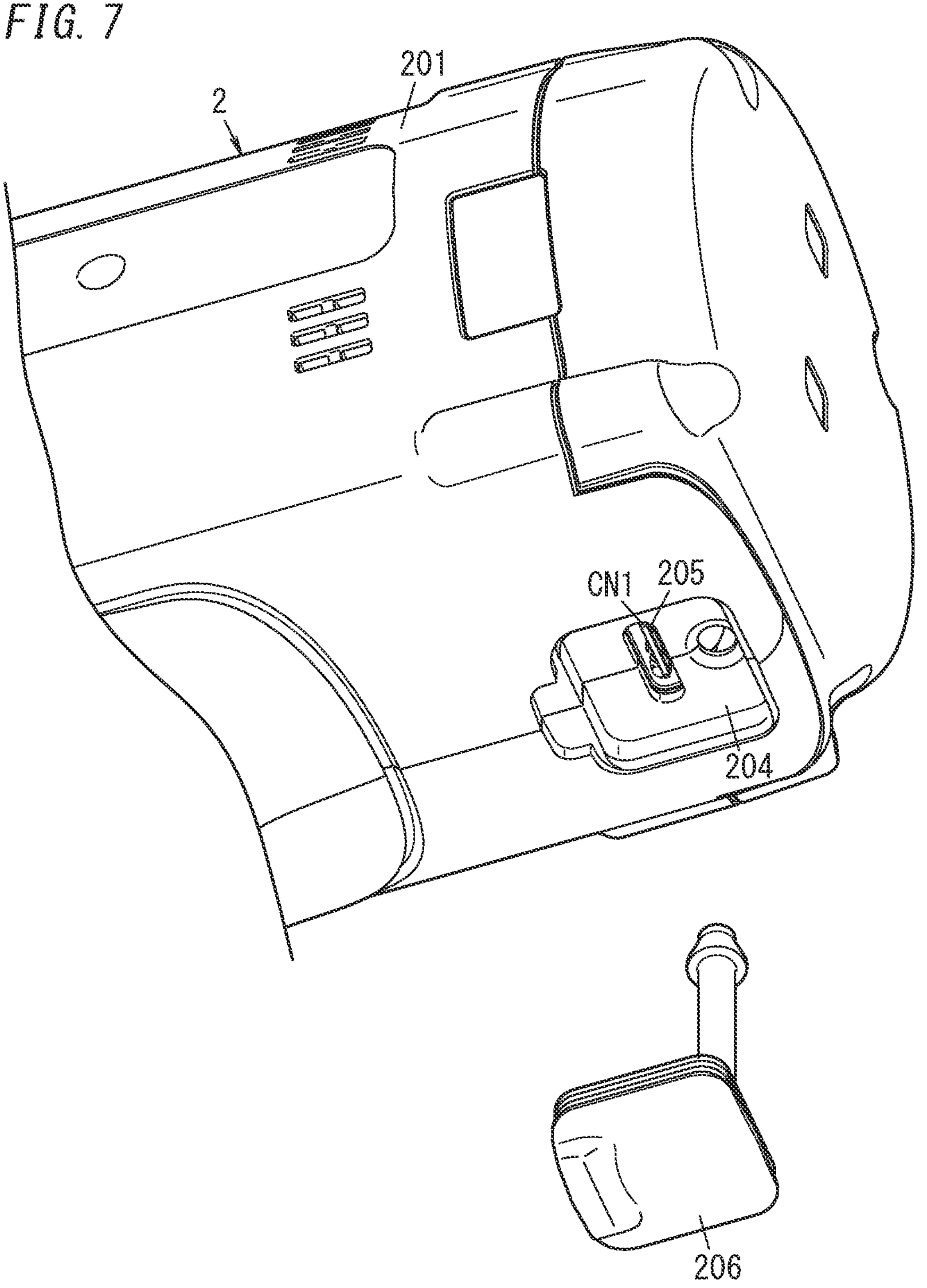
FIG. 7 is a perspective view of a main part of the electric tool according to the embodiment.

The wired communications unit 252 is configured to perform communications with the terminal device 3 connected to the electric tool 2 via a communications cable CB1, under the wired communications scheme complied with the USB standard, for example. In the wired communications mode, the wired communications unit 252 reads out, from the storage unit 27, the working data stored in the storage unit 27, and transmits the read out data to the terminal device 3. According to the embodiment, the barrel 201 of the electric tool 2 is provided at a rear end of a circumferential surface thereof with a recess 204 as shown in FIG. 7. An USB connector CN1 of a female-side is exposed through a hole 205 formed in a bottom of the recess 204. As shown in FIG. 4, USB connectors CN2, CN3 of male-side are provided at both ends of the communications cable CB1, respectively. By connecting the USB connector CN2 provided at a first end of the communications cable CB1 to the USB connector CN1 of the electric tool 2 and connecting the USB connector CN3 provided at a second end of the communications cable CB1 to an USB connector of a female-side provided to the terminal device 3, the electric tool 2 is connected to the terminal device 3 through the communications cable CB1. Accordingly, communications are performed between the wired communications unit 252 of the electric tool 2 and a wired communications unit 31 (see FIG. 1) of the terminal device 3 under the wired communications scheme. To the recess 204 of the barrel 201, a lid member 206 (see FIG. 7) made of synthetic resin and having flexibility may be removably attached when the USB connector CN2 or CN3 of the communications cable CB1 is disconnected from the USB connector CN1. This can keep the dust or moisture off of the USB connector CN1.

The power source unit 26 includes the storage battery. The power source unit 26 is provided in the battery pack 261. The battery pack 261 includes the power source unit 26 and the case made of resin in which the power source unit 26 is housed. When the battery pack 261 is detached from the battery attachment base 203 of the tool body 200 and then the detached battery pack 261 is connected to a battery charger, the storage battery of the power source unit 26 can be recharged. The power source unit 26 supplies, using the electricity stored in the storage battery, the electric power required to operate the motor and the electric circuit including the controller 21.

The storage unit 27 may includes a Read Only Memory (ROM), non-volatile memory and the like, for example. Examples of the non-volatile memory includes an EEPROM and a flash memory. The storage unit 27 stores a control program to be executed by the controller 21. Moreover, the storage unit 27 stores the work instruction information supplied from the receiver 4 or the terminal device 3, and the working data relating to the details of the task(s) that has been performed based on the work instruction information. The working data may contain information indicating that a task has been performed, or information relating to a result of the performed task (information about the tightening torque value, the number of strokes, the rotation speed, the tightening time, the angle, the date-and-time, and the like). In a case where the task is the tightening task of tightening the first component with respect to the second component, the “information relating to a result of the performed task” may preferably contain information about a measured value of the tightening torque measured by the sensor unit 24 (i.e., the tightening torque value), the number of first components to which the tightening task has been performed and the like. The “information relating to a result of the performed task” may contain determination information about a quality (good or not) of the task (i.e., the determination result data) performed based on the work instruction information. Moreover, the storage unit 27 stores identification information uniquely allocated to the electric tool 2, information about a product type of the electric tool 2 (tool classification information) that may contain a manufacturer (company) of the electric tool 2 and a product number given by the manufacturer, and the like. The identification information may preferably contain an IP address given to the electric tool 2, for example.

The display unit 28 may include a 2-digit 7-segment LED (Light Emitting Diode) display provided on a surface of the tool body 200 (e.g., on an upper surface of the battery attachment base 203), for example. The display unit 28 may include a blue color LED and a red color LED provided on a surface of the tool body 200 (e.g., on a rear end surface of the barrel 201), for example.

In the battery attachment base 203, housed is a circuit board 101 on which circuit components of the wired communications unit 252 and the like are mounted. Moreover, in the barrel 201, housed are a circuit board 102 on which circuit components such as the LEDs of the display unit 28 and the like are mounted, and a circuit board 103 on which circuit components such as the USB connector CN1 and the like are mounted. According to the embodiment, two or more circuit boards including the circuit boards 101 to 103 are housed in the tool body 200. However, the present disclosure is not limited to the configuration where the circuit components of the electric tool 2 are distributed on the two or more circuit boards. Alternatively, all of the circuit components of the electric tool 2 may be mounted on a single circuit board.

(3.1.2) Receiver

As shown in FIG. 1, the receiver 4 includes a wireless communications unit 41, a wired communications unit 42, a controller 43, an operating unit 44, a display unit 45, and a storage unit 46.

The controller 43 controls operations of the wireless communications unit 41, the wired communications unit 42, the display unit 45 and the like. The controller 43 may include, as a major constituent element thereof, a computer system including one or more processors and one or more memories, for example. The computer system performs the function of the controller 43 by making the one or more processors execute a program stored in the one or more memories. The program may be stored in advance in the memory of the controller 43. Alternatively, the program may also be distributed after having been stored in a non-transitory storage medium such as a memory card or downloaded via a telecommunications line. The controller 43 may be implemented as a FPGA, ASIC or the like.

The wireless communications unit 41 includes a communications module configured to perform a near field wireless communication compliant with a communications scheme same as that of the wireless communications unit 251 of the electric tool 2 (e.g., the ZigBee standard). The wireless communications unit 41 performs the wireless communications with the wireless communications unit 251 of the electric tool 2.

The wired communications unit 42 includes a communications module configured to perform a wired communication through a communications line. The wired communications unit 42 is configured to perform a wired communication with a communications unit 51 of the host device 5 through a network 6 in compliant with the Ethernet standard, for example. The network 6 may include a Local Area Network (LAN) provided in a facility such as a factory where the electric tool 2 is to be used, a Wide Area Network (WAN) such as the Internet, and the like.

The operating unit 44 includes an operating switch configured to receive an operation performed by a user.

The display unit 45 may include a plurality of LEDs and display operating states of the receiver 4 by turning on, off, and flickering any one or more of the LEDs, for example. The display unit 45 may include a display device such as a liquid crystal display.

The storage unit 46 may include a ROM, RAM, non-volatile memory (such as EEPROM and flash memory), and the like, for example. The storage unit 46 stores the work instruction information relating to the working details of the tightening task to be performed using the electric tool 2 and the working data received from the electric tool 2, in association with the identification information of the electric tool 2. Accordingly, the storage unit 46 can store, with respect to each of a plurality of electric tools 2, the work instruction information transmitted to an electric tool 2 and the working data received from this electric tool 2. Moreover, the storage unit 46 stores identification information uniquely allocated to the receiver 4, information about a product type of the receiver 4 that may contain a manufacturer (company) of the receiver 4 and a product number given by the manufacturer, and the like. The identification information may preferably include an IP address given to the receiver 4, for example.

(3.1.3) Host Device

The host device 5 may be a server, for example. The host device 5 includes a communications unit 51, a storage unit 52, and a controller 53.

The communications unit 51 includes a communications module configured to perform a wired communication through a communications line. The communications unit 51 is configured to perform a wired communication with the wired communications unit 42 of the receiver 4 through the network 6 in compliant with the Ethernet standard, for example.

The storage unit 52 may include a ROM, RAM, non-volatile memory (such as EEPROM and flash memory), and the like, for example. The storage unit 52 stores, with respect to each of the plurality of electric tools 2, the work instruction information relating to the working details of the tightening task to be performed using an electric tool 2 and the history of the working data of the task performed by this electric tool 2, in association with the identification information of this electric tool 2.

The controller 53 controls operations of communications unit 51 and the like. The controller 53 may include, as a major constituent element thereof, a computer system including one or more processors and one or more memories, for example. The computer system performs the function of the controller 53 by making the one or more processors execute a program stored in the one or more memories. The program may be stored in advance in the memory of the controller 53. Alternatively, the program may also be distributed after having been stored in a non-transitory storage medium such as a memory card or downloaded via a telecommunications line. The controller 53 may be implemented as a FPGA, ASIC or the like.

The controller 53 is configured to transmit, from the communications unit 51 to the receiver 4, the work instruction information relating to the working details of the tightening task to be performed using an electric tool 2.

When the communications unit 51 receives the history of the working data of the task performed by the electric tool 2, the controller 53 stores the received history in the storage unit 52.

(3.1.4) Terminal Device

The terminal device 3 is a computer terminal install thereon a data importing application (computer program) to perform a setting of the communications mode of the electric tool 2 and receive the working data from the electric tool 2 under the wired communications scheme. The terminal device 3 may be a laptop computer, a tablet-type computer, a communications terminal such as a smartphone, or the like.

The terminal device 3 includes a controller 30, a wired communications unit 31, and a Human Machine Interface (HMI) 32.

The wired communications unit 31 is configured to be connected to the electric tool 2 through the communications cable CB1. The wired communications unit 31 is configured to perform communications with the wired communications unit 252 of the electric tool 2 through the communications cable CB1 under the wired communications scheme complied with the USB standard, for example.

The HMI 32 includes an input unit configured to receive a command entered by a manager, and an output unit configured to output information to the manager. According to the embodiment, the manager may be a person who uses the terminal device 3. The input unit for receiving the command entered by the manager may include a keyboard, a mouse, a switch, a microphone for inputting the sound and voice, and the like. The output unit for outputting the information to the manager may include a display device such as a liquid crystal display, a lamp such as a LED, a speaker for outputting the sound and voice, and the like.

The controller 30 controls operations of the wired communications unit 31, the HMI 32, and the like. The controller 30 may include, as a major constituent element thereof, a computer system including one or more processors and one or more memories, for example. The computer system performs the function of the controller 30 by making the one or more processors execute a program stored in the one or more memories. The program may be stored in advance in the memory of the controller 30. Alternatively, the program may also be distributed after having been stored in a non-transitory storage medium such as a memory card or downloaded via a telecommunications line. The controller 30 may be implemented as a FPGA, ASIC or the like.

In the following description, it will be explained a case where the manager who uses the terminal device 3 and the receiver 4 is a person different from a user who performs the tightening task using the electric tool 2. Of course, a manager who uses the terminal device 3 and the receiver 4 and a user who perform the tightening task using the electric tool 2 may be the same person.

(3.2) Description of Operations

Figure 8:
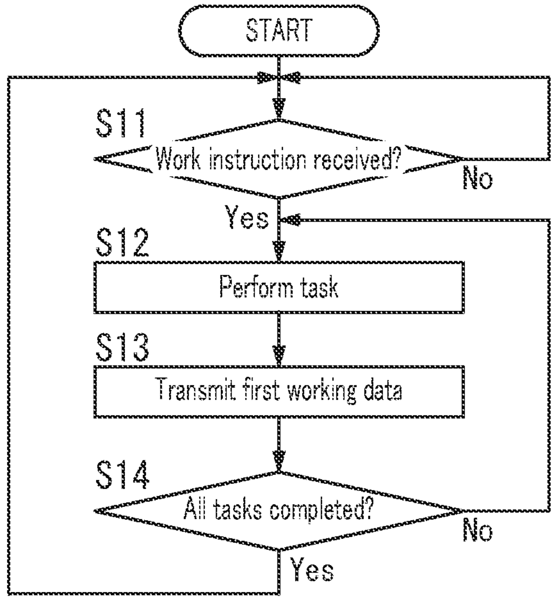
FIG. 8 is a flowchart showing operations of the electric tool in a first communications mode (wireless communications mode) according to the embodiment.

Operations of the electric tool 2 included in the electric tool system 1 will be explained with reference to FIGS. 8 and 9. The electric tool 2 has, as the communications mode for transmitting the working data, the wireless communications mode and the wired communications mode as described above. These two communications modes are explained hereinafter.

The communications mode of the electric tool 2 may be set with the use of the terminal device 3, for example. In a state where the terminal device 3 is connected to the electric tool 2 through the communications cable CB1, the manager makes the terminal device 3 execute the data importing application installed thereon, and enters appropriate commands on the data importing application to set the communications mode to either the wireless communications mode or the wired communications mode. In response to the command entered by the manager to set the communications mode with the data importing application, the controller 30 transmits, from the wired communications unit 31 to the electric tool 2, mode setting information for setting a communications mode. The wired communications unit 252 of the electric tool 2 receives the mode setting information, and then the controller 21 sets, based on the mode setting information, the communications mode to either the wireless communications mode or the wired communications mode. In other words, the controller 21 sets the communications mode to either the wireless communications mode or the wired communications mode based on the mode setting information supplied from the terminal device 3 connected through the communications cable CB1 to the wired communications unit 252 and received by the wired communications unit 252. The communications mode of the electric tool 2 can be set to either of the wireless communications mode and the wired communications mode using the terminal device 3. For example, when the manager sets the communications mode to the wireless communications mode and then ends the data importing application and disconnects the communications cable CB1 from the electric tool 2, and the electric tool 2 starts to operate under the wireless communications mode thus set. For example, after completion of the tasks by the electric tool 2, the manager connects the electric tool 2 to the terminal device 3 using the communications cable CB1 and sets the communications mode to the wired communications mode on the data importing application, and then the electric tool 2 starts to operate under the wired communications mode thus set. Note that the data importing application executed by the terminal device 3 further has a function of selecting (determining) the type of the working data to be stored in the storage unit 27 of the electric tool 2. Moreover, the data importing application executed by the terminal device 3 further has a function of selecting (determining) the type of the working data imported from the electric tool 2. Data type information that designates the type of the working data as the acquisition target may also be transmitted from the terminal device 3 to the electric tool 2.

(3.2.1) Operations in Wireless Communications Mode

An operation of the electric tool 2 set to the wireless communications mode will be described with reference to FIG. 8 and the like. In this example, in accordance with the instruction of the data type information supplied from the terminal device 3, the electric tool 2 is set to transmit, to the receiver 4, information on a determination result about the quality (good or not) of the task (i.e., determination result data) and time-series data of the tightening torque as the working data. Optionally, the electric tool 2 may be set to transmit, to the receiver 4, a measured value of the tightening torque (e.g., maximum value, average value, or the like) as the working data, in accordance with the instruction of the data type information. Note that the measured value of the tightening torque does not have to be transmitted to the receiver 4 as the working data. Contents of the working data to be transmitted may be appropriately changed.

To the electric tool 2 operating in the wireless communications mode, the work instruction information is transmitted from the receiver 4 under the wireless communications scheme.

When the manager enters commands through the operating unit 44 of the receiver 4 to create the work instruction information (containing e.g., the information relating to the tightening torque, the information on the number of the tightening task to be performed and the like) relating to one or more times of the tightening task to be transmitted to the electric tool 2, the work instruction information thus created is transmitted from the wireless communications unit 41 to the electric tool 2 as a setting target. Optionally, the receiver 4 may be configured to perform communications with the terminal device 3 and to receive, from the terminal device 3, the work instruction information created by the terminal device 3 and to transmit the received work instruction information to the electric tool 2 as the setting target. Furthermore, the receiver 4 may receive, from the host device 5, the work instruction information created by the host device 5 and transmit the received work instruction information to the electric tool 2 as the setting target.

When the wireless communications unit 251 of the electric tool 2 receives the work instruction information transmitted from the receiver 4 (Yes in Step S11), the controller 21 stores the work instruction information in the storage unit 27. Moreover, the controller 21 displays, on the 7-segment LED display of the display unit 28, information that the work instruction information has been received and that the tightening task is ready to start. Note that, while the wireless communications unit 251 is receiving the work instruction information from the receiver 4, the controller 21 turns on a communication information indicator LED included in the display unit 28 to indicate that the electric tool 2 is currently performing the communications with the receiver 4. When the communication through the wireless communications unit 251 with the receiver 4 has finished, the controller 21 flashes on an off the communication information indicator LED of the display unit 28 to inform that the communication with the receiver 4 has finished and that the tightening task to be performed by the tightening unit 23 is ready to start.

When the tightening task by the tightening unit 23 is ready to start, the user holds the electric tool 2 and moves to a working area. The user then adjusts the position and orientation of the electric tool 2 to fit the tip tool attached via the socket to the output shaft 231 to the first component, and then pulls the trigger switch 221, whereby the controller 21 controls the operation of the tightening unit 23 according to the work instruction information, as a result the tightening task is performed to tighten the first component with respect to the second component (in step S12). The work instruction information contains the information relating to the tightening torque as described above, and the controller 21 controls the tightening unit 23 such that the measured value of the tightening torque measured by the sensor unit 24 (i.e., the tightening torque value) agrees to the target value of the tightening torque (i.e., torque setting value) contained in the work instruction information. As such, in the wireless communications mode, the wireless communications unit 251 receives the work instruction information relating to the tightening task and the controller 21 controls the tightening unit 23 based on the work instruction information. According to the embodiment therefore, by using the receiver 4, the work instruction information relating to the tightening task can be transmitted to the electric tool 2 which is placed distant from the receiver 4. This configuration thus can save the labor of connecting the electric tool 2 to the terminal device 3 using the communications cable CB1 to receive the work instruction information from the terminal device 3. The user-friendliness can be improved accordingly.

When the tightening task using the tightening unit 23 finishes one time, the controller 21 temporarily stores, as the working data and, in the memory of the controller 21 information on a determination result about the quality (good or not) of the task (i.e., determination result data); the measured value of the tightening torque (e.g., maximum value, average value, or the like); and the time-series data of the tightening torque during a period from a start to an end of the tightening task of this one time, which are determined based on the measured result of the sensor unit 24. Then, the controller 21 transmits, from the wireless communications unit 251 to the receiver 4, the working data (i.e., the first working data) containing the information on the determination result temporarily stored in the memory together with the identification information allocated to this electric tool 2 (in step S13). In other words, in the wireless communications mode, the wireless communications unit 251 transmits at least part of the working data under the wireless communications scheme when the tightening task finishes one time. That is, every time the tightening task finishes one time, (part of) the working data corresponding to the tightening task that has been performed using the electric tool 2 is transmitted to the receiver 4. It is therefore possible to determine, before starting a next tightening task, the quality (good or not) of the tightening task that has finished. If the tightening task is determined to be bad, the tightening task that has just finished may be performed again. Moreover, such data would be useful to improve the quality of the next or later tightening task. When receiving the working data transmitted from the electric tool 2 through the wireless communications unit 41, the receiver 4 associates the working data (the information on the determination result) thus received with the identification information of the electric tool 2 as a sender (i.e., from which the working data is transmitted) and a receiving time (i.e., a clock time when received the working data), and stores it in the storage unit 46. It should be noted that during a transmission period (the transmission period may be at least part of the above-described waiting period) during which the wireless communications unit 251 transmits the working data, the controller 21 controls the tightening unit 23 so as not to perform the tightening task. This configuration can reduce the possibility that electromagnetic noises arising from the tightening task performed by the tightening unit 23 may cause a communications error on a wireless communication between the wireless communications unit 251 and the receiver 4.

Moreover, the controller 21 may be configured to turn on or flash on and off an indicator LED based on the information on the determination result. This configuration allows the user who users the electric tool 2 to see the information on the determination result.

At that time, if all of the one or more times of the tightening task based on the work instruction information received in the step S11 have not finished yet (No in step S14), the electric tool 2 returns to the step S12 and performs a next tightening task.

If all of the one or more times of the tightening task based on the work instruction information received in the step S11 have finished (Yes in the step S14), the controller 21 stops the tightening task by the tightening unit 23, and returns to the step S11 to wait for new work instruction information. That is, the controller 21 stops the tightening unit 23 from performing the tightening task when all of the one or more times of the tightening task based on the work instruction information have finished. This can reduce the possibility that the electric tool 2 continues performing the tightening task without the work instruction information set to the electric tool 2.

As described above, the time-series data of the tightening torque is also temporarily stored as the working data in the memory of the controller 21. However, since the time-series data of the tightening torque has usually comparatively large data size, it takes comparatively a long time to transmit the time-series data of the tightening torque compared to a time for transmitting the information on the determination result. If the time-series data of the tightening torque is transmitted during the interval between tightening tasks performed by the electric tool 2, then there causes a problem that a length of time during which the tightening work cannot be performed becomes long due to the transmission of the time-series data of the tightening torque. In this embodiment therefore, the controller 21 wirelessly transmits the time-series data of the tightening torque from the wireless communications unit 251 to the receiver 4 after finish of all of the one or more times of the tightening task based on the work instruction information. This can reduce the possibility that the wireless transmission of the time-series data of the tightening torque and the identification information of the electric tool 2 may cause a delay in performing the tightening tasks.

Note that, in a case where the work instruction information supplied to the electric tool 2 contains a work instruction relating to the batch work in which an unit task is performed plurality times one after another, the wireless communications unit 251 may transmit, to the receiver 4, at least part (e.g., time-series data of the tightening torque) of the working data temporarily stored in the memory of the controller 21 when the batch work has finished (i.e., when the unit task finishes the plurality times). Moreover, in a case where the work instruction information supplied to the electric tool 2 contains a work instruction relating to the plurality times of the tightening task, the wireless communications unit 251 may transmit, to the receiver 4, at least part of the working data temporarily stored in the memory of the controller 21 when the plurality times of the tightening task designated by the work instruction information have finished. That is, in the wireless communications mode, when the tightening tasks finishes the plurality times, the wireless communications unit 251 may transmit at least part of the working data under the wireless communications scheme. Reduction in the number of times of performing the wireless communication can reduce the number of interruptions caused by the transmission of the working data, which is useful for a tightening task having a comparatively short takt time. Moreover, reduction in the number of times of performing the wireless communication can contribute to reducing the power consumption. Moreover, at a timing when the tightening task finishes the plurality times, the working data relating to the tightening tasks performed using the electric tool 2 is transmitted to the receiver 4. It is therefore possible to confirm the qualities (good or not) of the tightening tasks before starting the following tightening task. If (at least one of) the tightening tasks is determined to be bad, the tightening task may be performed again.

Moreover, in the wireless communications mode, the wireless communications unit 251 transmits the working data temporarily stored in the memory of the controller 21. This can omit the time to access the storage unit 27, which is necessary in a case where the working data stored in the storage unit 27 is read out and then transmitted. The time required for the wireless transmission can be shortened accordingly.

In the embodiment, the controller 21 transmits, from the wireless communications unit 251 to the receiver 4, the information on the determination result indicating the determined quality (good or not) of the task every time the tightening task finishes one time, but is not limited to this. Alternatively, the controller 21 may transmit the measured value of the tightening torque from the wireless communications unit 251 to the receiver 4 every time the tightening task finishes one time. Further alternatively, the controller 21 may transmit, from the wireless communications unit 251 to the receiver 4, the information on the determination result indicating the determined quality (good or not) of the task and the measured value of the tightening torque every time the tightening task finishes one time.

(3.2.2) Operations in Wired Communications Mode

An operation of the electric tool 2 set to the wired communications mode will be described with reference to FIG. 9 and the like. In this example, in accordance with the instruction of the data type information supplied from the terminal device 3, the electric tool 2 is set to transmit, to the terminal device 3, information on a determination result about the quality (good or not) of the task (i.e., determination result data) and time-series data of the tightening torque as the working data. Optionally, the electric tool 2 may be set to transmit, to the terminal device 3, a measured value of the tightening torque (e.g., maximum value, average value, or the like) as the working data, in accordance with the instruction of the data type information. Note that the measured value of the tightening torque does not have to be transmitted to the terminal device 3 as the working data. Contents of the working data to be transmitted may be appropriately changed.

The manager connects the USB connector CN2 of the communications cable CB1 to the USB connector CN1 of the electric tool 2, and connects the USB connector CN3 of the communications cable CB1 to the terminal device 3. Thus, the electric tool 2 and the terminal device 3 are connected to each other through the communications cable CB1 (in step S1). When finding that the electric tool 2 and the terminal device 3 are connected to each other through the communications cable CB1 and thus the wired communications unit 252 is ready to communicate with the wired communications unit 31, the controller 21 turns on the communication information indicator LED of the display unit 28 to indicate that the communication under the wired communications scheme has started.

On the data importing application, the manager enters commands through the HMI 32 of the terminal device 3 to select an electric tool 2 as a setting target. When the manager enters commands through the HMI 32 of the terminal device 3 to create the work instruction information (containing e.g., the information relating to the tightening torque, the information on the number of the tightening task to be performed and the like) relating to one or more times of the tightening task to be set to the electric tool 2, the wired communications unit 31 transmits the work instruction information thus created to the electric tool 2. When the wired communications unit 252 of the electric tool 2 receives the work instruction information transmitted from the terminal device 3 (in step S2), the controller 21 stores the work instruction information in the storage unit 27. Moreover, the controller 21 displays, on the 7-segment LED display of the display unit 28, information that the work instruction information has been received and that the tightening task is ready to start. Optionally, the terminal device 3 may receive the work instruction information from the host device 5 through the receiver 4 and set (transmit) the received work instruction information to the electric tool 2.

When the tightening task using the electric tool 2 is ready to start, the user (who uses the electric tool 2 to perform the tightening task) disconnects the USB connector CN2 from the USB connector CN1 of the electric tool 2 (in step S3), and attaches the lid member 206 to the recess 204 of the barrel 201. Disconnection of the USB connector CN2 from the USB connector CN1 disables the communications between the wired communications unit 31 and the wired communications unit 252. When finding the disconnection, the controller 21 turns off the communication information indicator LED of the display unit 28 to indicate that the communication according to the wired communications unit 31 is disabled.

Thereafter, the user holds the electric tool 2 and moves to a working area. The user then adjusts the position and orientation of the electric tool 2 to fit the tip tool attached via the socket to the output shaft 231 to the first component, and then pulls the trigger switch 221, whereby the controller 21 controls the operation of the tightening unit 23 according to the work instruction information, as a result the tightening task is performed to tighten the first component with respect to the second component (in step S4). When the tightening task using the tightening unit 23 finishes one time, the controller 21 stores, as the working data, in the storage unit 27 information on a determination result about the quality (good or not) of the task (i.e., determination result data); the measured value of the tightening torque; and the time-series data of the tightening torque during a period from a start to an end of the tightening task of this one time, which are determined based on the measured result of the sensor unit 24 (in step S5).

The controller 21 then determines whether all of the one or more times of the tightening task based on the work instruction information have finished or not (in step S6). Determined that all of the tightening tasks have not finished yet (No in the step S6), the controller 21 returns to the step S4 and performs a next tightening task.

Determined that all of the one or more times of the tightening task based on the work instruction information have finished (Yes in the step S6), the controller 21 stops the tightening task by the tightening unit 23. In this condition, the controller 21 controls the tightening unit 23 (motor) not to rotate even when the trigger switch 221 is pulled. Moreover, the controller 21 displays, on the 7-segment LED display of the display unit 28, information that all of the tightening task have finished.

Thereafter, the user holds the electric tool 2 and moves to a location where the terminal device 3 is situated, and connects the USB connector CN2 of the communications cable CB1 to the USB connector CN1 of the electric tool 2 and connects the USB connector CN3 of the communications cable CB1 to the terminal device 3. Thus, the electric tool 2 and the terminal device 3 are connected to each other through the communications cable CB1 (in step S7). When finding that the electric tool 2 and the terminal device 3 are connected to each other through the communications cable CB1 and thus the wired communications unit 252 is ready to communicate with the wired communications unit 31, the controller 21 turns on the communication information indicator LED of the display unit 28 to indicate that the communication under the wired communications scheme has started.

On the data importing application, the user or manager enters commands through the HMI 32 of the terminal device 3 to acquire the working data from the electric tool 2. In response to the commands, the controller 30 transmits, from the wired communications unit 31 to the electric tool 2, transfer instruction information for instructing the electric tool 2 to transfer the working data. When the wired communications unit 252 of the electric tool 2 receives the transfer instruction information from the terminal device 3, the controller 21 reads out the working data (the information on the determination result, the measured value of the tightening torque, and the time-series date of the tightening torque) stored in the storage unit 27, and transmits the read out data from the wired communications unit 252 to the terminal device 3 under the wired communications scheme (in step S8). Note that, after completion of the transfer of the working data from the electric tool 2 to the terminal device 3, the controller 21 may delete the working data from the storage unit 27. The working data transferred from the electric tool 2 to the terminal device 3 may contain at least one or all of the information on the determination result, the measured value of the tightening torque, and the time-series data of the tightening torque.

When the transfer of the working data to the terminal device 3 from the electric tool 2 is completed, the HMI 32 of the terminal device 3 outputs (displays) information that the transfer of the working data is completed. When confirming that the transfer of the working data is completed, the user or manager disconnects the USB connector CN2 from the electric tool 2 and ends the tightening task. The user or manager may operate the HMI 32 to set new work instruction information to the electric tool 2 to start a new tightening task using the electric tool 2.

According to the wired communications mode, the working data stored in the storage unit 27 while the electric tool 2 is operating in the wired communications mode is transmitted from the electric tool 2 to the terminal device 3 at a time when the electric tool 2 is connected to the terminal device 3 through the communications cable CB1. According to this configuration, the tightening task is less likely to be interrupted compared to a case where the working data is wirelessly transmitted during a course of the sequence of the tightening tasks using the electric tool 2. The user-friendliness can be improved accordingly. The time-series data of the tightening torque is transmitted under the wired communications scheme which has a faster transmission rate than the wireless communications scheme, and therefore it is possible to shorten the time required for the transmission of the time-series data of the tightening torque. The user-friendliness thus can be further improved. Moreover, in a case where the wireless communication between the electric tool 2 and the receiver 4 is not good, the communications mode of the communications unit 25 can be set to the wired communications mode to allow the working data to be transmitted from the electric tool 2 to the terminal device 3 by the wired communications mode, which can further improve the user-friendliness. Optionally, the terminal device 3 may be configured to perform communications with the receiver 4. In this case, the terminal device 3 may transmit the working data stored in the memory of the terminal device 3 to the receiver 4.

(4) Communication Control Method, and Program Etc.

The functions of electric tool 2 of the electric tool system 1 may also be implemented as a communication control method of the electric tool 2, a (computer) program, or a non-transitory storage medium that stores the program thereon. A communication control method of the electric tool 2 according to one aspect includes setting the communications mode for transmitting the working data from the communications unit 25 to the wireless communications mode or the wired communications mode. In the wireless communications mode, the wireless communications unit 251 transmits, when the tightening task finishes one or more times, the working data relating to the measurement result output from the sensor unit 24 under the wireless communications scheme. In the wired communications mode, the wired communications unit 252 transmits, under the wired communications scheme, the working data stored the storage unit 27 while operating in the wired communications mode. A (computer) program according to one aspect is designed to cause the computer system to perform the communication control method of the electric tool 2.

The electric tool system 1 (of the electric tool 2, the receiver 4, and the host device 5) and the terminal device 3 according to the present disclosure includes a computer system. The computer system may include, as principal hardware components, a processor and a memory. The functions of the electric tool system 1 (of the electric tool 2, the receiver 4, and the host device 5) and the terminal device 3 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits such as an IC and an LSI include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

(5) Other Variations

Note that the embodiment described above is only an exemplary one of various embodiments of the present disclosure and should not be construed as limiting. Rather, the embodiment may be readily modified in various manners depending on a design choice or any other factor without departing from the scope of the present disclosure.

Hereinafter, variations of the embodiment will be enumerated one after another. Note that the variations to be described below may be adopted as appropriate in combination.

In the embodiment described above, the communications mode of the communications unit 25 may include a combination mode, in addition to the wireless communications mode and the wired communications mode. In the combination mode, both the wireless communication by the wireless communications unit 251 and the wired communication by the wired communications unit 252 can be performed. In this case, the controller 21 sets, based on the mode setting information supplied from the terminal device 3, the communications mode to any of the wireless communications mode, the wired communications mode, and the combination mode. In a case where the communications mode of the communications unit 25 is set to the combination mode, the wireless communication can be performed by the wireless communications unit 251 at desired timings, and the wired communications can be performed by the wired communications unit 252 as long as the electric tool 2 is connected by a wire with the terminal device 3. In the combination mode, the wireless communication by the wireless communications unit 251 and the wired communication by the wired communications unit 252 may be performed simultaneously.

In the embodiment described above, at least some functions distributed in two or more devices (such as the receiver 4 and the host device 5) may be aggregated together in a single housing. For example, some functions distributed in the receiver 4 and the host device 5 in the above embodiment may be aggregated together in a single housing. Moreover, some functions of the terminal device 3 and some functions of the receiver 4 and/or the host device 5 may be aggregated together in a single housing.

Some functions of each of the receiver 4, the host device 5 and the terminal device 3 may be aggregated in a single housing or may be distributed in multiple different housings. At least some functions of the receiver 4 such as some functions of the controller 43 may be implemented as a cloud computing system.

The example illustrated in FIGS. 1 and 4 includes only one electric tool 2. However, the number of electric tools 2 configured to communicate with a single receiver 4 is not limited to one, but may be two or more, namely may be changed as appropriate. The example illustrated in FIGS. 1 and 4 includes only one terminal device 3. However, the number of terminal devices 3 is not limited to one, but may be changed as appropriate. The example illustrated in FIGS. 1 and 4 includes only one receiver 4. Alternatively, two or more receivers 4 may be connected to a single host device 5. The number of receivers 4 may be changed as appropriate.

In the embodiment described above, the electric tool 2 is an impact tool configured to perform the tightening task of the tightening a component, but impact mechanism may be an optional component. That is, the electric tool 2 may be an electric tool without the impact mechanism.

In the embodiment described above, the task performed using the electric tool 2 is the tightening task of tightening the first component with respect to the second component. Alternatively, the electric tool 2 may be an electric tool used for a task (such as a hole making task, milling task, and cutting task) other than the tightening task. The work details of the working data may be changed as appropriate according to the details of the task performed using the electric tool 2.

(Recapitulation)

As apparent from the description of the above, an electric tool (2) according to a first aspect includes a tightening unit (23), a sensor unit (24), a communications unit (25), a storage unit (27), and a tool body (200) of portable type. The tightening unit (23) is configured to perform a tightening task of tightening a component by a drive force of a drive source. The sensor unit (24) is configured to perform a measurement processing. The measurement processing includes measuring at least a tightening torque provided by the tightening unit (23) to obtain working data relating to a result of measurement. The communications unit (25) is configured to transmit the working data. The storage unit (27) is configured to store the working data. The tool body (200) houses therein or holds the tightening unit (23), the sensor unit (24), the communications unit (25), and the storage unit (27). The electric tool (2) has, as a communications mode for transmitting the working data stored in the storage unit (27) from the communications unit (25), a first communications mode and a second communications mode. The communications unit (25) is configured to, in the first communications mode, transmit, during an interval between the tightening tasks, first working data, and in the second communications mode, transmit at least second working data after completion of all of the tightening tasks. The first working data is part of the working data stored in the storage unit (27). The second working data is the working data stored in the storage unit (27) except the first working data.

According to this aspect, the communications mode includes the first communications mode and the second communications mode. In the first communications mode, the first working data which is part of the working data is transmitted during an interval between tightening tasks. In the second communications mode, the second data which is remaining part of the working data is transmitted at minimum after completion of all of the tightening tasks. This can contribute to shortening a period of time (waiting period) during which the tightening task cannot be not performed. Thus, the tightening task is less likely to be interrupted by the transmission of the working data. It is therefore possible to provide the electric tool (2) with the improved user-friendliness.

In an electric tool (2) according to a second aspect, realized in combination with the first aspect, the communications unit (25) is configured to, in the first communications mode, every time the tightening task finishes one or more times, transmit one or more pieces of the first working data of the working data stored in the storage unit (27) corresponding to the one or more times of the tightening task that has finished. The communications unit (25) is configured to, in the second communications mode, after completion of all of the tightening tasks, transmit at least the second working data of the working data stored in the storage unit (27) corresponding to all of the tightening tasks.

According to this aspect, in the first communications mode, every time the tightening task finishes one or more times, one or more pieces of the first working data corresponding to the one or more times of the tightening is transmitted. Further, in the second communications mode, after completion of all of the tightening tasks, the second working data corresponding to all of the tightening tasks is transmitted. This can contribute to equally shortening the waiting periods contained in a sequence of tightening tasks.

In an electric tool (2) according to a third aspect, realized in combination with the second aspect, the measurement processing includes torque measurement processing, determination processing, and related measurement processing. The torque measurement processing includes performing a torque measurement of measuring the tightening torque to obtain a tightening torque value which is a result of the torque measurement. The determination processing includes performing a determination about a quality of the tightening task based on the tightening torque value to obtain determination result data relating to a result of the determination. The related measurement processing includes performing a related measurement relating to the torque measurement to obtain a related value which is a result of the related measurement. The first working data contains at least one kind of information selected from a group consisting of the tightening torque value and the determination result data. The second working data contains one or more kinds of information selected from a group consisting of the tightening torque value, the determination result data, and the related value except the at least one kind of information contained in the first working data.

According to this aspect, in a case where the tightening torque value, the determination result data, and the related value are obtained, the first working data contains at least one kind of information selected from a group consisting of the tightening torque value and the determination result data, and the second working data contains one or more kinds of information that are other than the at least one kind of information contained in the first working data. This can contribute to reducing the amount of information to be transmitted in the first communications mode to shorten the waiting period effectively.

In an electric tool (2) according to a fourth aspect, realized in combination with the third aspect, the first working data contains the determination result data. The second working data contains the tightening torque value and the related value.

According to this aspect, the first working data contains the determination result data, and the second working data contains the tightening torque value and the related value. This can contribute to reducing the amount of information to be transmitted in the first communications mode to shorten the waiting period more effectively.

Note that in a case where case where the first working data contains the tightening torque value and does not contain the determination result data, the determination is performed on the receiver (4) side. Compared to this case, this aspect can contribute to reducing the processing load on the receiver (4) side. This reduction effect become more prominent as the increase in the number of the electric tools 2 that communicate with the receiver (4).

In an electric tool (2) according to a fifth aspect, realized in combination with the fourth aspect, the communications unit (25) is configured to, in the second communications mode, transmit detail working data. The detail working data contains both the first working data and the second working data.

According to this aspect, the determination result data which is part of the detail working data is transmitted in the first communications mode, and (entire of) the detail working data containing the determination result data is transmitted in the second communications mode. Since the determination result data is transmitted first in the first communications mode, a data receiving device side (such as the receiver 4) can appropriately perform a control (such as a control of a line speed) based on the received determination result data on a real-time basis. Furthermore, since the detail working data containing the determination result data is transmitted later in the second communications mode, a data receiving device side (such as the terminal device 3) can easily manage and use the detail working data (e.g., easily store the detail working data, improve the process steps based on the stored detail working data).

In an electric tool (2) according to a sixth aspect, realized in combination with the fifth aspect, the storage unit (27) is configured to delete, from the storage unit (27), part, transmitted by the communications unit (25), of the detail working data.

According to this aspect, out of the detail working data stored in the storage unit (27), the working data that has been transmitted is automatically deleted from the storage unit (27). This can contribute to saving the available memory space of the storage unit (27).

In an electric tool (2) according to a seventh aspect, realized in combination with the sixth aspect, the storage unit (27) is configured, in the first communications mode, even when the communications unit (25) transmits the determination result data, not to delete the determination result data transmitted by the communications unit (25), and in the second communications mode, when the communications unit transmits the detail working data, to delete the detail working data transmitted by the communications unit (25).

According to this aspect, in the first communications mode, the determination result data transmitted is not deleted, but in the second communications mode, entire of the detail working data transmitted is deleted. It is therefore possible to transmit (entire of) the detail working data while saving the available memory space of the storage unit (27).

In an electric tool (2) according to an eighth aspect, realized in combination with the seventh aspect, the storage unit (27) is configured, in the second communications mode, not to delete immediately but keep the detail working data transmitted by the communications unit (25) as long as possible.

According to this aspect, since the detail working data is kept as long as possible, it is possible to re-transmit the detail working data, for example.

In an electric tool (2) according to a ninth aspect, realized in combination with any one of the first to eighth aspects, the communications unit (25) includes a wireless communications unit (251) and a wired communications unit (252). The wireless communications unit (251) is configured to transmit the first working data under a wireless communications scheme. The wired communications unit (252) is configured to transmit the second working data under a wired communications scheme. The first communications mode is a wireless communications mode. The second communications mode is a wired communications mode. In the wireless communications mode, the wireless communications unit (251) transmits the first working data under the wireless communications scheme during the interval between tightening tasks. In the wired communications mode, the wired communications unit (252) transmits at least the second working data under the wired communications scheme after completion of all of the tightening tasks.

According to this aspect, the first communications mode is the wireless communications mode and the second communications mode is the wired communications mode. In the wireless communications mode, the wireless communications unit (251) transmits the first working data under the wireless communications scheme during the interval between tightening tasks, and in the wired communications mode, the wired communications unit (252) transmits at least the second working data under the wired communications scheme after completion of all of the tightening tasks. Accordingly, the tightening task is less likely to be interrupted by the transmission of the working data compared to a configuration where entire of the working data is transmitted during the interval between tightening tasks under the wireless communications scheme. The user-friendliness can be improved accordingly.

In a variation realized in combination with the ninth aspect, the wireless communications unit (251) may be configured to, in the wireless communications mode, transmit a piece of the first working data under the wireless communications scheme when the tightening task finishes one time.

According to this configuration, the wireless communications unit (251) transmits the first working data under the wireless communications scheme every time the tightening task finishes one time. This configuration can therefore contribute to provide the real-time control (such as a real-time control of a line speed, real-time control of the tightening unit 23) based on the first working data. Moreover, in a case where the first working data contains the tightening torque value and does not contain the determination result data, it is possible, before a next tightening task is performed, to determine (to perform the determination about) the quality (good or not) of the tightening task on the receiver (4) side based on the first working data.

In a variation realized in combination with the ninth aspect, in the wireless communications mode, the wireless communications unit (251) may be configured to, when the tightening tasks finishes plurality times, transmit plurality pieces of the first working data under the wireless communications scheme.

According to this configuration, every time the tightening task finishes the plurality times, the wireless communications unit (251) transmits the first working data under the wireless communications scheme. This can therefore contribute to provide the real-time control while reducing the number of times of performing the wireless communication.

In a variation realized in combination with the ninth aspect, the electric tool (2) may further include a controller (21). The controller (21) may be configured to control operations of the tightening unit (23). In the wireless communications mode, the wireless communications unit (251) may be configured to receive work instruction information relating to the tightening task, and the controller (21) may be configured to control the tightening unit (23) based on the work instruction information.

According to this configuration, it is possible to transmit new work instruction information to the electric tool (2) from a device which is placed distant from the electric tool (2). The user-friendliness can be improved accordingly.

Moreover, the controller (21) may be configured to stop the tightening task by the tightening unit (23) when all of the tightening tasks based on the work instruction information have finished.

The tightening task by the tightening unit (23) can be inhibited to be performed when the work instruction information relating to the tightening task is not supplied.

In a variation realized in combination with the ninth aspect, the controller (21) may be configured to stop the tightening task by the tightening unit (23) in a transmission period during which the wireless communications unit (251) transmits the working data.

According to this configuration, it is possible to reduce the possibility that noises arising from the tightening task performed by the tightening unit (23) may cause a communications error in the wireless communications unit (251).

In a variation realized in combination with the ninth aspect, the controller (21) may be configured to set the communications mode to either the wireless communications mode or the wired communications mode, based on mode setting information supplied from a terminal device (3) connected to the wired communications unit (252) through the communications cable (CB1) and received by the wired communications unit (252).

According to this configuration, the communications mode can be set using the terminal device (3).

An electric tool system (1) according to a tenth aspect includes the electric tool (2) of any one of the first to ninth aspects and a receiver (4). The receiver (4) is configured to receive the working data transmitted from the communications unit (25).

According to this aspect, the electric tool (2) has, as the communications mode for the communications unit (25), the first communications mode and the second communications mode. In the first communications mode, the first working data is transmitted during an interval between tightening tasks, and in the second communications mode, at least the second data is transmitted after completion of all of the tightening tasks. This can contribute to shortening a period of time (waiting period) during which the tightening task is not performed. Thus, the tightening task is less likely to be interrupted by the transmission of the working data. It is therefore possible to provide the electric tool system (1) including the electric tool (2) with the improved user-friendliness.

The present disclosure is not limited to the above aspects. Moreover, various configurations of the electric tool (2) according to the embodiment (including variations thereof) may be implemented as a control method of the electric tool (2), a (computer) program, or a non-transitory storage medium that stores the program thereon.

The second to tenth aspects are not essential to the electric tool (2) according to the disclosure but may be omitted as appropriate.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. An electric tool, comprising:

a tightening unit including a motor and configured to perform a plurality of tightening tasks by repeatedly performing a tightening task of tightening a component by a drive force of the motor as a drive source;

a sensor unit configured to perform a measurement processing including measuring at least a tightening torque provided by the tightening unit while each of the plurality of tightening tasks is performed and obtaining working data relating to a result of measurement, the working data including first working data and second working data;

a communications unit configured to transmit the working data;

a storage unit configured to store the working data including the first working data and the second working data; and a tool body which is portable and which houses therein or holds the tightening unit, the sensor unit, the communications unit, and the storage unit, the electric tool having, as a communications mode for transmitting the working data stored in the storage unit from the communications unit, a first communications mode and a second communications mode, the measurement processing including:

torque measurement processing including performing a torque measurement of measuring the tightening torque and obtaining a tightening torque value which is a result of the torque measurement; and determination processing including performing a determination about a quality of each of the plurality of tightening tasks based on the tightening torque value and obtaining determination result data relating to a result of the determination, the first working data including one of the tightening torque value or the determination result data for each of the plurality of tightening tasks, the second working data including the other of the tightening torque value or the determination result data for each of the plurality of tightening tasks, and the communications unit being configured to, in the first communications mode, transmit, during an interval between tightening tasks, without transmitting the second working data, the first working data which is part of the working data stored in the storage unit, and in the second communications mode, transmit at least the second working data after completion of all of the plurality of tightening tasks, without transmitting the first working data, the second working data to be transmitted being for all of the plurality of tightening tasks and being the working data stored in the storage unit except the first working data.

2. The electric tool of claim 1, wherein the communications unit is configured to, in the first communications mode, every time the tightening task finishes one or more times, transmit one or more pieces of the first working data of the working data stored in the storage unit corresponding to the one or more times of the tightening task that has finished, and in the second communications mode, after completion of all of the plurality of tightening tasks, transmit at least the second working data of the working data stored in the storage unit corresponding to all of the plurality of tightening tasks.

3. The electric tool of claim 2, wherein the communications unit includes a wireless communications unit configured to transmit the first working data under a wireless communications scheme, and a wired communications unit configured to transmit the second working data under a wired communications scheme, the first communications mode is a wireless communications mode, the second communications mode is a wired communications mode, in the wireless communications mode, the wireless communications unit transmits the first working data under the wireless communications scheme during the interval between tightening tasks, and in the wired communications mode, the wired communications unit transmits at least the second working data under the wired communications scheme after completion of all the plurality of tightening tasks.

4. An electric tool system, comprising:

the electric tool of claim 2; and a receiver configured to receive the working data transmitted from the communications unit.

5. The electric tool of claim 2, wherein the measurement processing includes related measurement processing including performing a related measurement relating to the torque measurement and obtaining a related value which is a result of the related measurement, and the second working data contains one or more selected from the group consisting of the tightening torque value, the determination result data, and the related value except that the first working data includes.

6. The electric tool of claim 5, wherein the communications unit includes a wireless communications unit configured to transmit the first working data under a wireless communications scheme, and a wired communications unit configured to transmit the second working data under a wired communications scheme, the first communications mode is a wireless communications mode, the second communications mode is a wired communications mode, in the wireless communications mode, the wireless communications unit transmits the first working data under the wireless communications scheme during the interval between tightening tasks, and in the wired communications mode, the wired communications unit transmits at least the second working data under the wired communications scheme after completion of all the plurality of tightening tasks.

7. An electric tool system, comprising:

the electric tool of claim 5; and a receiver configured to receive the working data transmitted from the communications unit.

8. The electric tool of claim 5, wherein the first working data contains the determination result data, and the second working data contains the tightening torque value and the related value.

9. The electric tool of claim 8, wherein the communications unit includes a wireless communications unit configured to transmit the first working data under a wireless communications scheme, and a wired communications unit configured to transmit the second working data under a wired communications scheme, the first communications mode is a wireless communications mode, the second communications mode is a wired communications mode, in the wireless communications mode, the wireless communications unit transmits the first working data under the wireless communications scheme during the interval between tightening tasks, and in the wired communications mode, the wired communications unit transmits at least the second working data under the wired communications scheme after completion of all the plurality of tightening tasks.

10. The electric tool of claim 8, wherein the communications unit is configured to, in the second communications mode, transmit detail working data containing both the first working data and the second working data.

11. The electric tool of claim 10, wherein the communications unit includes a wireless communications unit configured to transmit the first working data under a wireless communications scheme, and a wired communications unit configured to transmit the second working data under a wired communications scheme, the first communications mode is a wireless communications mode, the second communications mode is a wired communications mode, in the wireless communications mode, the wireless communications unit transmits the first working data under the wireless communications scheme during the interval between tightening tasks, and in the wired communications mode, the wired communications unit transmits at least the second working data under the wired communications scheme after completion of all the plurality of tightening tasks.

12. The electric tool of claim 10, wherein the storage unit is configured to delete, from the storage unit, part of the working date, transmitted by the communications unit, of the detail working data.

13. The electric tool of claim 12, wherein the communications unit includes a wireless communications unit configured to transmit the first working data under a wireless communications scheme, and a wired communications unit configured to transmit the second working data under a wired communications scheme, the first communications mode is a wireless communications mode, the second communications mode is a wired communications mode, in the wireless communications mode, the wireless communications unit transmits the first working data under the wireless communications scheme during the interval between tightening tasks, and in the wired communications mode, the wired communications unit transmits at least the second working data under the wired communications scheme after completion of all the plurality of tightening tasks.

14. The electric tool of claim 12, wherein the storage unit is configured, in the first communications mode, even when the communications unit transmits the determination result data, not to delete the determination result data transmitted by the communications unit, and in the second communications mode, when the communications unit transmits the detail working data, to delete the detail working data transmitted by the communications unit.

15. The electric tool of claim 14, wherein the communications unit includes a wireless communications unit configured to transmit the first working data under a wireless communications scheme, and a wired communications unit configured to transmit the second working data under a wired communications scheme, the first communications mode is a wireless communications mode, the second communications mode is a wired communications mode, in the wireless communications mode, the wireless communications unit transmits the first working data under the wireless communications scheme during the interval between tightening tasks, and in the wired communications mode, the wired communications unit transmits at least the second working data under the wired communications scheme after completion of all the plurality of tightening tasks.

16. The electric tool of claim 14, wherein the storage unit is configured, in the second communications mode, not to delete immediately but keep the detail working data transmitted by the communications unit as long as possible.

17. The electric tool of claim 16, wherein the communications unit includes a wireless communications unit configured to transmit the first working data under a wireless communications scheme, and a wired communications unit configured to transmit the second working data under a wired communications scheme, the first communications mode is a wireless communications mode, the second communications mode is a wired communications mode, in the wireless communications mode, the wireless communications unit transmits the first working data under the wireless communications scheme during the interval between tightening tasks, and in the wired communications mode, the wired communications unit transmits at least the second working data under the wired communications scheme after completion of all the plurality of tightening tasks.

18. The electric tool of claim 1, wherein the communications unit includes a wireless communications unit configured to transmit the first working data under a wireless communications scheme, and a wired communications unit configured to transmit the second working data under a wired communications scheme, the first communications mode is a wireless communications mode, the second communications mode is a wired communications mode, in the wireless communications mode, the wireless communications unit transmits the first working data under the wireless communications scheme during the interval between tightening tasks, and in the wired communications mode, the wired communications unit transmits at least the second working data under the wired communications scheme after completion of all the plurality of tightening tasks.

19. An electric tool system, comprising:

the electric tool of claim 18; and a receiver configured to receive the working data transmitted from the communications unit.

20. An electric tool system, comprising:

the electric tool of claim 1; and a receiver configured to receive the working data transmitted from the communications unit.

* * * * *